United States Patent
Chapman et al.

(10) Patent No.: US 7,861,800 B2
(45) Date of Patent: Jan. 4, 2011

(54) COMBINING BELIEF NETWORKS TO GENERATE EXPECTED OUTCOMES

(75) Inventors: Clinton D. Chapman, Missouri City, TX (US); Charles Chen, Missouri City, TX (US)

(73) Assignee: Schlumberger Technology Corp, Sugar Land, TX (US)

( * ) Notice: Subject to any disclaimer, the term of this patent is extended or adjusted under 35 U.S.C. 154(b) by 205 days.

(21) Appl. No.: 12/247,352

(22) Filed: Oct. 8, 2008

(65) Prior Publication Data

US 2010/0084191 A1 Apr. 8, 2010

(51) Int. Cl.
*E21B 44/00* (2006.01)
*E21B 47/00* (2006.01)

(52) U.S. Cl. .......................................... 175/24; 175/40
(58) Field of Classification Search .................... 175/24, 175/40

See application file for complete search history.

(56) References Cited

U.S. PATENT DOCUMENTS

| | | | |
|---|---|---|---|
| 6,868,920 B2 | 3/2005 | Hoteit et al. | |
| 7,055,601 B2 | 6/2006 | Barrow | |
| 7,128,167 B2 | 10/2006 | Dunlop et al. | |
| 7,743,006 B2 * | 6/2010 | Woronow et al. | ............. 706/17 |
| 2005/0209912 A1 | 9/2005 | Veeningen et al. | |

OTHER PUBLICATIONS

Akadang et al., "An Approach for Managing Uncertainties in Well Design Coupling Monte Carlo and Bayesian Networks: Practical Application to Well Planning in Nigeria", 31st Annual SPE International Technical Conference and Exhibition , Abuja, Nigeria, Aug. 2007, pp. 1-11.

* cited by examiner

*Primary Examiner*—William P Neuder
(74) *Attorney, Agent, or Firm*—Robert P. Lord; Cuong L Nguyen; Bryan P Galloway

(57) ABSTRACT

A method is described for determining an oilfield parameter for a drilling operation in an oilfield, the oilfield having a well site with a drilling tool advanced into a subterranean formation with geological structures and reservoirs therein. A first set of decision factors and a second set of decision factors about the drilling operation are identified. Each of the first set of decision factors is contained within a first set of nodes, and each of the second set of decision factors is contained within a second set of nodes. Both the first set of nodes and the second set of nodes contain a set of common nodes, which are common to both the first and second sets. The first set of nodes is associated to create a first belief network and the second set of nodes is associated to create a second belief network. Then, the set of common nodes of the first belief network is associated with the set of common nodes of the second belief network to form a multinet belief network. Oilfield parameter can be generated from the multinet belief network.

23 Claims, 14 Drawing Sheets

| FIRST NETWORK DETERMINATION 1312 | SECOND NETWORK DETERMINATION 1314 | MULTINET DETERMINATION 1316 | | |
|---|---|---|---|---|
| NETWORK 1: KICK DETECTED | NETWORK 2: KICK DETECTED | YES | NO | |
| YES | YES | 99.000 | 1.000 | ← SITUATION 1 1310 |
| YES | NO | 70.000 | 30.000 | ← SITUATION 2 1318 |
| NO | YES | 30.000 | 70.000 | ← SITUATION 3 1320 |
| NO | NO | 1.000 | 99.000 | ← SITUATION 4 1322 |

COMBINING BELIEF NETWORKS TO GENERATE EXPECTED OUTCOMES

BACKGROUND OF THE INVENTION

1. Field of the Invention

This invention relates to methods and systems for determining an oilfield parameter for a drilling operation in an oilfield. In particular, the invention provides methods, apparatuses, and systems to more effectively and efficiently determine an oilfield parameter for a drilling operation in an oilfield using combined belief networks.

2. Background of the Invention

During the oilfield operations, data is typically collected for analysis and/or monitoring of the oilfield operations. Such data may include, for example, subterranean formation, equipment, historical and other data. Data concerning the subterranean formation is collected using a variety of sources. Such formation data may be static or dynamic. Static data relates to formation structure and geological stratigraphy that defines the geological structure of the subterranean formation. Dynamic data relates to fluids flowing through the geologic structures of the subterranean formation. Such static and/or dynamic data may be collected to learn more about the formations and the valuable assets contained therein.

While performing these oilfield operations, various conditions can occur while drilling or pumping that can require prompt action. However, these conditions are noticeable only from the data collected. Because different operators and engineers can interpret the collected data to arrive at dissimilar conclusions, it is often difficult to accurately characterize the downhole conditions that are occurring. Determining a most acceptable course of action to take in response to the encountered condition can therefore take time away from production or drilling, resulting in lost profits to the enterprise.

Despite improvements in data collection and modeling, there remains a need to quickly and effectively interpret and model data collected from a wellsite in response to an encountered condition.

SUMMARY OF THE INVENTION

In view of the above problems, an object of the present invention is to provide methods, apparatuses, and systems for determining a well site parameter, while eliminating or minimizing the impact of the problems and limitations described.

A method is described for determining an oilfield parameter for a drilling operation in an oilfield, the oilfield having a well site with a drilling tool advanced into a subterranean formation with geological structures and reservoirs therein. A first set of decision factors and a second set of decision factors about the drilling operation are identified. Each of the first set of decision factors is contained within a first set of nodes, and each of the second set of decision factors is contained within a second set of nodes. Both the first set of nodes and the second set of nodes contain a set of common nodes, which are common to both the first and second sets The first set of nodes is associated to create a first belief network and the second set of nodes is associated to create a second belief network. Then, the set of common nodes of the first belief network is associated with the set of common nodes of the second belief network to form a multinet belief network. Oilfield parameters can be generated from the multinet belief network.

The method for determining an oilfield parameter for a drilling operation in an oilfield can also include assigning a first degree of certainty to the first belief network and assigning a second degree of certainty to the second belief network. The first belief network can then be preferred over the second belief network in generating the oilfield parameters. The preference given to the first preference is based at least in part on a relative difference between the first degree of certainty and the second degree of certainty.

The method for determining an oilfield parameter for a drilling operation in an oilfield can also include the first belief network including a first node and second node. The second belief network can include a third node and a fourth node. The first node and the third node are common nodes, and the second node and the fourth node are common nodes. Associating the set of common nodes of the first belief network with the set of common nodes of the second belief network to form a multinet belief network therefore includes associating the first node with the third node and associating the second node with the fourth node.

Information about the drilling operation can consist of equipment for use in the well site, completion techniques used in the well site, production data from the well site, well log data from the well site, mud log data from the well site, expert information, and combinations thereof.

The method for determining an oilfield parameter for a drilling operation in an oilfield can also include directing the drilling operation in the oilfield at the well site based on the oilfield parameter generated from the multinet belief network.

The method for determining an oilfield parameter for a drilling operation in an oilfield can also include collecting a set of information and entering the set of information into nodes in the multinet belief network in order to generate the oilfield parameters from the multinet belief network. The drilling operation can then be adjusted based on the oilfield parameter generated from the multinet belief network.

The method for determining an oilfield parameter for a drilling operation in an oilfield can also include adjusting the drilling operation in the oilfield at the well site in real time based on the oilfield parameter.

The oilfield parameter can be, but is not limited to, a potential problem in an oil well selected from the group consisting of: hole cleaning, sticking, borehole analysis design, trajectory design, whirl, vibration, shock, stability, tendency, bit design, bit selection, offset correlation, kick detection, swab/surge, motor efficiency, drilling automation, positional uncertainty, and survey program detection. The oilfield parameter can also be an operating parameter, which can be, but is not limited to, measured and controlled values such as weight on bit, hookload, surface weight on bit, pump flow rate, mud rheology, and downhole tool settings such as, but not limited to, preferred tool face, rotary steerable system idle mode, and logging while drilling control parameters. Additionally, the oilfield parameter can be, but is not limited to, signal event detection for use in telemetry, logging while drilling, formation determination, signal filtering, and change point determination. Oilfield parameters can also be, but not limited to, validity of any entered or measured oilfield parameters.

Other objects, features, and advantages of the present invention will become apparent to those of skill in art by reference to the figures, the description that follows, and the claims.

DETAILED DESCRIPTION OF THE DRAWINGS

In the following detailed description of the preferred embodiments and other embodiments of the invention, reference is made to the accompanying drawings. It is to be understood that those of skill in the art will readily see other embodiments and changes may be made without departing from the scope of the invention.

Figure 1A:
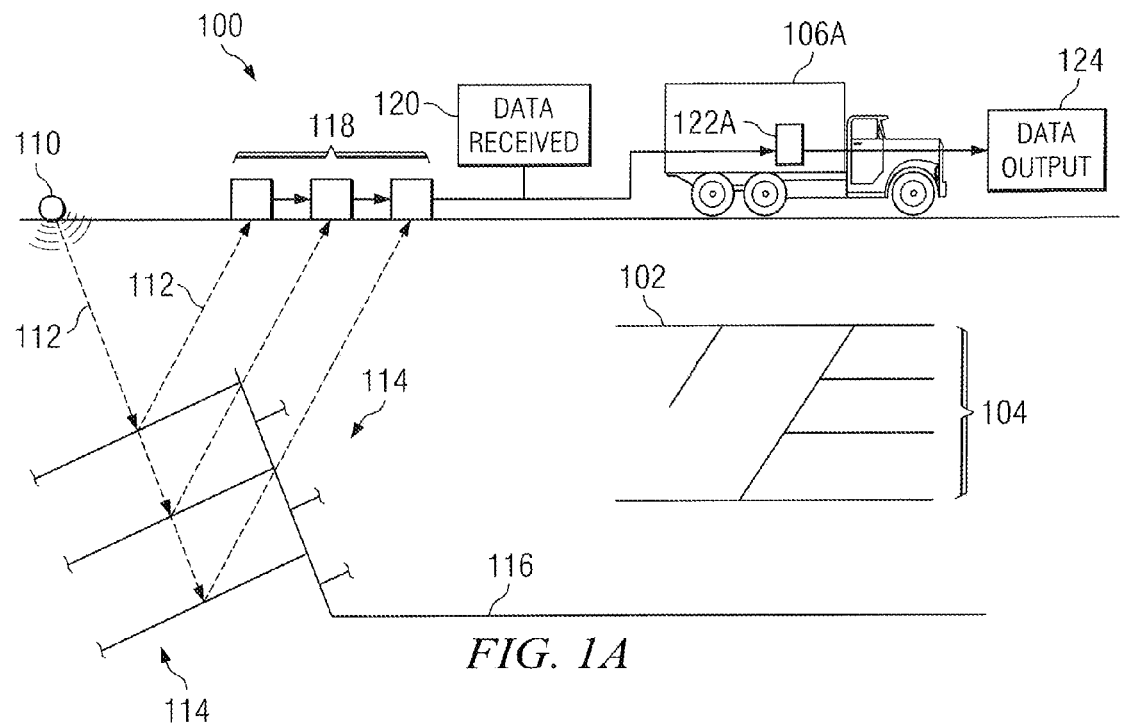
FIGS. 1A-1D are simplified, representative, schematic views of an oilfield having a subterranean formation containing a reservoir therein and depicting various oilfield operations being performed on the oilfield.

FIGS. 1A-1D depict simplified, representative, schematic views of oilfield 100 having subterranean formation 102 containing reservoir 104 therein and depicting various oilfield operations being performed on the oilfield. FIG. 1A depicts a survey operation being performed by a survey tool, such as seismic truck 106a, to measure properties of the subterranean formation. The survey operation is a seismic survey operation for producing sound vibrations. In FIG. 1A, one such sound vibration, sound vibration 112 generated by source 110, reflects off horizons 114 in earth formation 116. A set of sound vibration, such as sound vibration 112 is received in by sensors, such as geophone-receivers 118, situated on the earth's surface. In response to receiving these vibrations, geophone receivers 118 produce electrical output signals, referred to as data received 120 in FIG. 1A.

In response to the received sound vibration(s) 112 representative of different parameters (such as amplitude and/or frequency) of sound vibration(s) 112, geophones 118 produce electrical output signals containing data concerning the subterranean formation. Data received 120 is provided as input data to computer 122a of seismic truck 106a, and responsive to the input data, computer 122a generates seismic data output 124. This seismic data output may be stored, transmitted or further processed as desired, for example by data reduction.

Figure 1B:
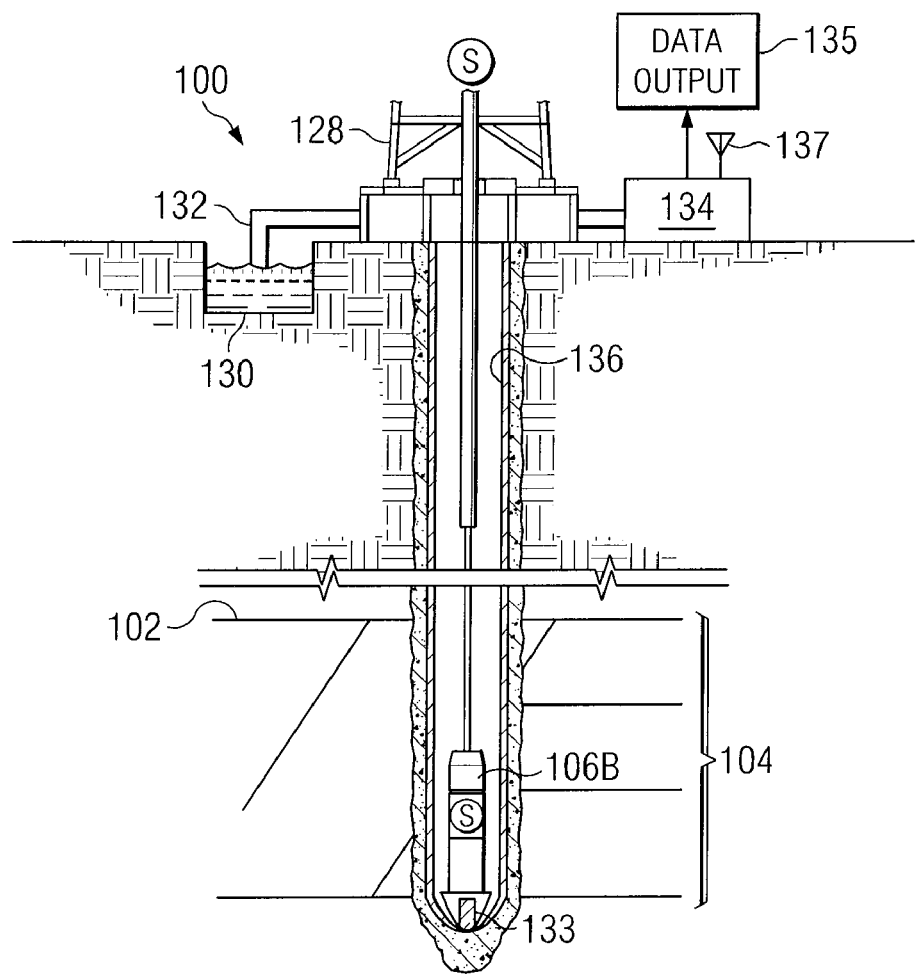

FIG. 1B depicts a drilling operation being performed by drilling tools 106b suspended by rig 128 and advanced into subterranean formations 102 to form well bore 136. Mud pit 130 is used to draw drilling mud into the drilling tools via flow line 132 for circulating drilling mud through the drilling tools, up well bore 136 and back to the surface. The drilling mud is usually filtered and returned to the mud pit. A circulating system may be used for storing, controlling, or filtering the flowing drilling muds. The drilling tools are advanced into the subterranean formations 102 to reach reservoir 104. Each well may target one or more reservoirs. The drilling tools are preferably adapted for measuring downhole properties using logging while drilling tools. The logging while drilling tool may also be adapted for taking core sample 133 as shown, or removed so that a core sample may be taken using another tool.

Surface unit 134 is used to communicate with the drilling tools and/or offsite operations. Surface unit 134 is capable of communicating with the drilling tools to send commands to the drilling tools, and to receive data therefrom. Surface unit 134 is preferably provided with computer facilities for receiving, storing, processing, and/or analyzing data from the oilfield. Surface unit 134 collects data generated during the drilling operation and produces data output 135, which may be stored or transmitted. Computer facilities, such as those of the surface unit, may be positioned at various locations about the oilfield and/or at remote locations.

Sensors S, such as gauges, may be positioned about the oilfield to collect data relating to various oilfield operations as described previously. As shown, sensor S is positioned in one or more locations in the drilling tools and/or at rig 128 to measure drilling parameters, such as weight on bit, torque on bit, pressures, temperatures, flow rates, compositions, rotary speed, and/or other parameters of the oilfield operation. Sensors S may also be positioned in one or more locations in the circulating system.

The data gathered by sensors S may be collected by surface unit 134 and/or other data collection sources for analysis or other processing. The data collected by sensors S may be used alone or in combination with other data. The data may be collected in one or more databases and/or transmitted on or offsite. All or select portions of the data may be selectively used for analyzing and/or predicting oilfield operations of the current and/or other well bores. The data may be historical data, real time data, or combinations thereof. The real time data may be used in real time, or stored for later use. The data may also be combined with historical data or other inputs for further analysis. The data may be stored in separate databases, or combined into a single database.

The collected data may be used to perform analysis, such as modeling operations. For example, the seismic data output may be used to perform geological, geophysical, and/or reservoir engineering. The reservoir, well bore, surface, and/or process data may be used to perform reservoir, well bore, geological, geophysical, or other simulations. The data outputs from the oilfield operation may be generated directly from the sensors, or after some preprocessing or modeling. These data outputs may act as inputs for further analysis.

The data may be collected and stored at surface unit 134. One or more surface units may be located at oilfield 100, or connected remotely thereto. Surface unit 134 may be a single unit, or a complex network of units used to perform the necessary data management functions throughout the oilfield. Surface unit 134 may be a manual or automatic system. Surface unit 134 may be operated and/or adjusted by a user.

Surface unit 134 may be provided with transceiver 137 to allow communications between surface unit 134 and various portions of oilfield 100 or other locations. Surface unit 134 may also be provided with or functionally connected to one or more controllers for actuating mechanisms at oilfield 100. Surface unit 134 may then send command signals to oilfield 100 in response to data received. Surface unit 134 may receive commands via the transceiver or may itself execute commands to the controller. A processor may be provided to analyze the data (locally or remotely), make the decisions, and/or actuate the controller. In this manner, oilfield 100 may be selectively adjusted based on the data collected. This technique may be used to optimize portions of the oilfield operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

Figure 1C:
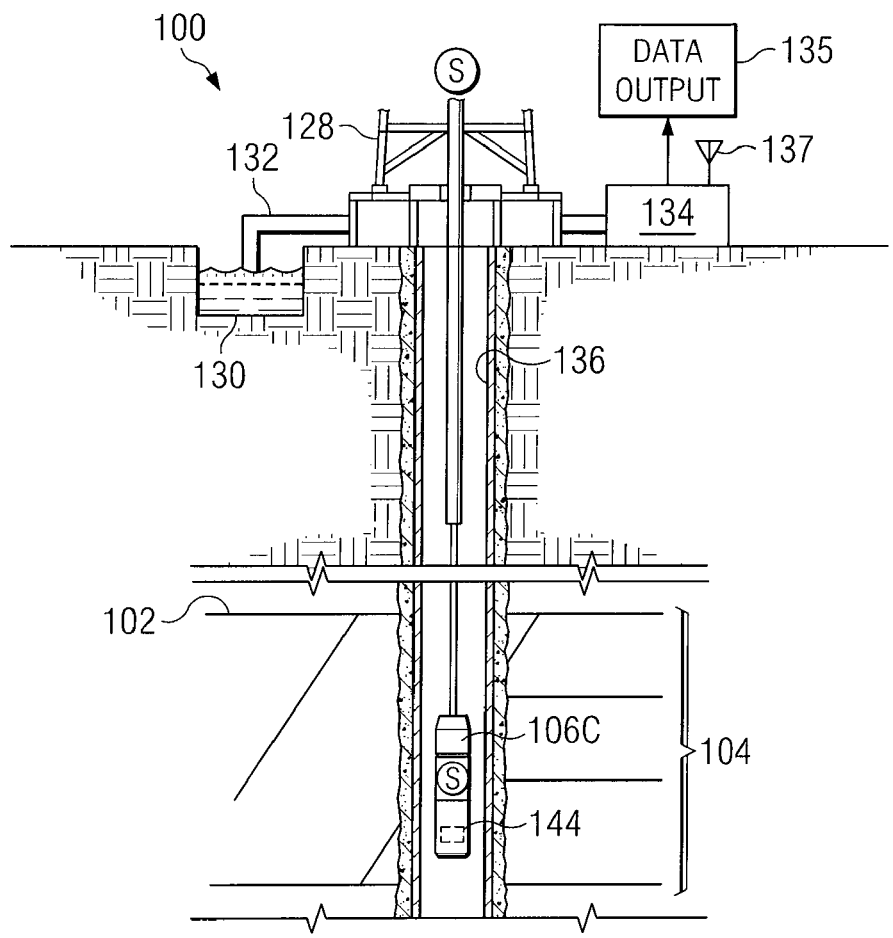

FIG. 1C depicts a wireline operation being performed by wireline tool 106c suspended by rig 128 and into well bore 136 of FIG. 1B. Wireline tool 106c is preferably adapted for deployment into a well bore for generating well logs, performing downhole tests and/or collecting samples. Wireline tool 106c may be used to provide another method and apparatus for performing a seismic survey operation. Wireline tool 106c of FIG. 1C may, for example, have an explosive, radioactive, electrical, or acoustic energy source 144 that sends and/or receives electrical signals to surrounding subterranean formations 102 and fluids therein.

Wireline tool 106c may be operatively connected to, for example, geophones 118 and computer 122a of seismic truck 106a of FIG. 1A. Wireline tool 106c may also provide data to surface unit 134. Surface unit 134 collects data generated during the wireline operation and produces data output 135 that may be stored or transmitted. Wireline tool 106c may be positioned at various depths in the well bore to provide a survey or other information relating to the subterranean formation.

Sensors S, such as gauges, may be positioned about oilfield 100 to collect data relating to various oilfield operations as described previously. As shown, the sensor S is positioned in wireline tool 106c to measure downhole parameters, which relate to, for example porosity, permeability, fluid composition, and/or other parameters of the oilfield operation.

Figure 1D:
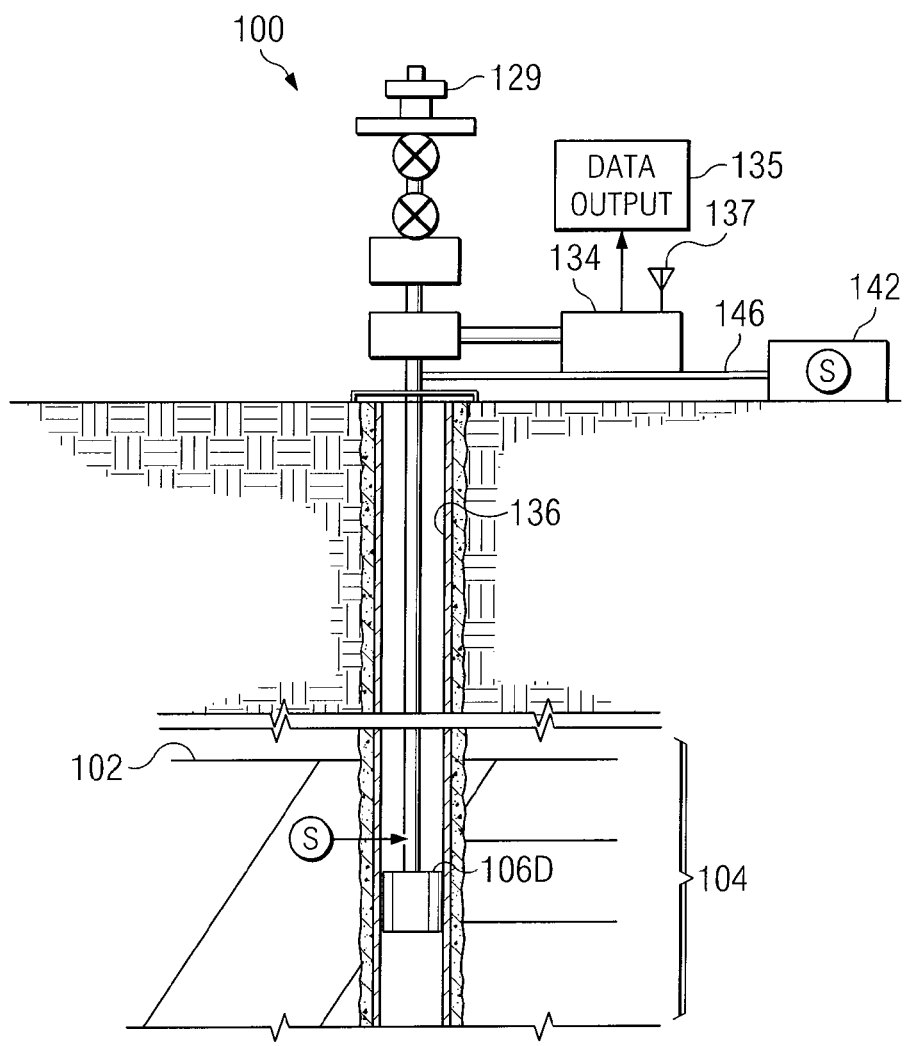

FIG. 1D depicts a production operation being performed by production tool 106d deployed from a production unit or Christmas tree 129 and into completed well bore 136 of FIG. 1C for drawing fluid from the downhole reservoirs into surface facilities 142. Fluid flows from reservoir 104 through perforations in the casing (not shown) and into production tool 106d in well bore 136 and to surface facilities 142 via a gathering network 146.

Sensors S, such as gauges, may be positioned about oilfield 100 to collect data relating to various oilfield operations as described previously. As shown, the sensor S may be positioned in production tool 106d or associated equipment, such as Christmas tree 129, gathering network 146, surface facility 142, and/or the production facility, to measure fluid parameters, such as fluid composition, flow rates, pressures, temperatures, and/or other parameters of the production operation.

While only simplified well site configurations are shown, it will be appreciated that the oilfield may cover a portion of land, sea, and/or water locations that hosts one or more well sites. Production may also include injection wells (not shown) for added recovery. One or more gathering facilities may be operatively connected to one or more of the well sites for selectively collecting downhole fluids from the well site(s).

While FIGS. 1B-1D depict tools used to measure properties of an oilfield, it will be appreciated that the tools may be used in connection with non-oilfield operations, such as mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors S may be located at various positions along the well bore and/or the monitoring tools to collect and/or monitor the desired data. Other sources of data may also be provided from offsite locations.

The oilfield configuration of FIGS. 1A-1D is intended to provide a brief description of an example of an oilfield usable with the present invention. Part, or all, of oilfield 100 may be on land, water, and/or sea. Also, while a single oilfield measured at a single location is depicted, the present invention may be utilized with any combination of one or more oilfields, one or more processing facilities and one or more well sites.

Figure 2A:
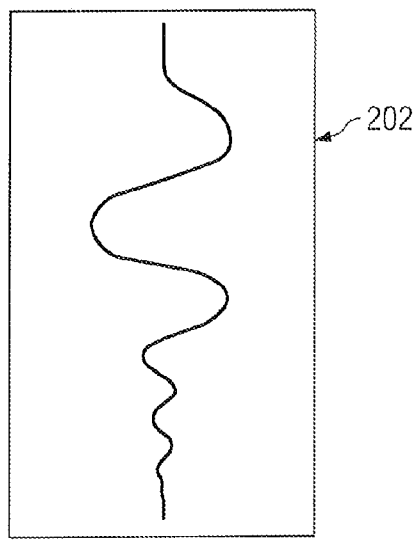
FIGS. 2A-2D are graphical depictions of examples of data collected by the tools of FIG. 1.
Figure 2B:
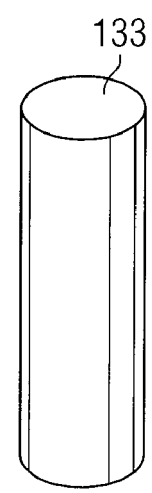
Figure 2C:
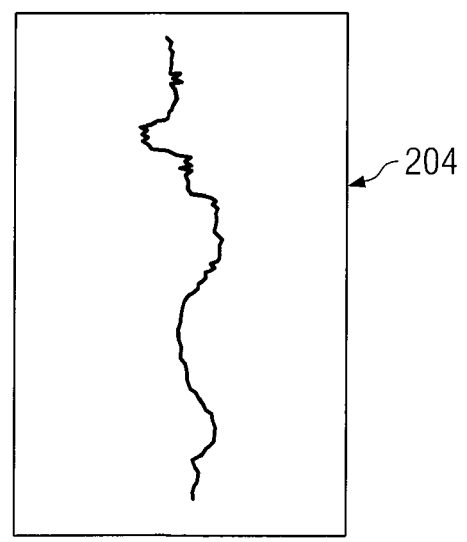
Figure 2D:
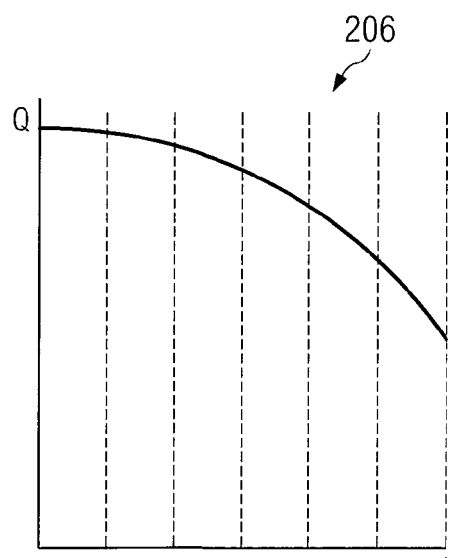

FIGS. 2A-2D are graphical depictions of examples of data collected by the tools of FIGS. 1A-1D, respectively. FIG. 2A depicts seismic trace 202 of the subterranean formation of FIG. 1A taken by seismic truck 106a. Seismic trace 202 may be used to provide data, such as a two-way response over a period of time. FIG. 2B depicts core sample 133 taken by drilling tools 106b. Core sample 133 may be used to provide data, such as a graph of the density, porosity, permeability, or other physical property of the core sample over the length of the core. Tests for density and viscosity may be performed on the fluids in the core at varying pressures and temperatures. FIG. 2C depicts well log 204 of the subterranean formation of FIG. 1C taken by wireline tool 106c. The wireline log typically provides a resistivity or other measurement of the formation at various depts. FIG. 2D depicts a production decline curve or graph 206 of fluid flowing through the subterranean formation of FIG. 1D measured at surface facilities 142. The production decline curve typically provides the production rate Q as a function of time t.

The respective graphs of FIGS. 2A-2C depict examples of static measurements that may describe or provide information about the physical characteristics of the formation and reservoirs contained therein. These measurements may be analyzed to better define the properties of the formation(s) and/or determine the accuracy of the measurements and/or for checking for errors. The plots of each of the respective measurements may be aligned and scaled for comparison and verification of the properties.

FIG. 2D depicts an example of a dynamic measurement of the fluid properties through the well bore. As the fluid flows through the well bore, measurements are taken of fluid properties, such as flow rates, pressures, composition, etc. As described below, the static and dynamic measurements may be analyzed and used to generate models of the subterranean formation to determine characteristics thereof. Similar measurements may also be used to measure changes in formation aspects over time.

Figure 3:
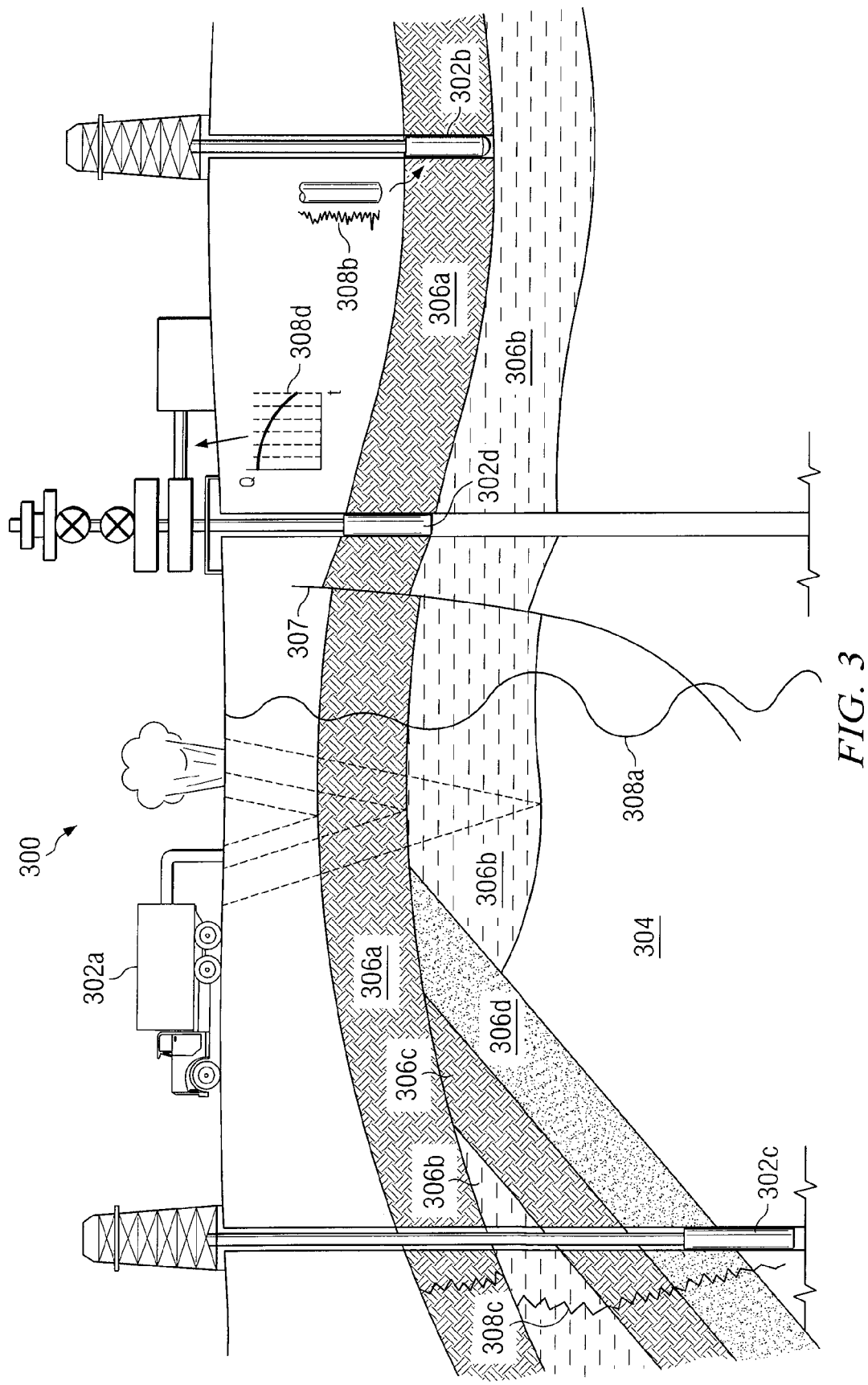
FIG. 3 is a schematic view, partially in cross section of an oilfield having data acquisition tools positioned at various locations along the oilfield for collecting data of the subterranean formation.

FIG. 3 is a schematic view, partially in cross section of oilfield 300 having data acquisition tools 302a, 302b, 302c and 302d positioned at various locations along the oilfield for collecting data of the subterranean formation 304. Data acquisition tools 302a-302d may be the same as data acquisition tools 106a-106d of FIGS. 1A-1D, respectively, or others not depicted. As shown, data acquisition tools 302a-302d generate data plots or measurements 308a-308d, respectively. These data plots are depicted along the oilfield to demonstrate the data generated by the various operations.

Data plots 308a-308c are examples of static data plots that may be generated by data acquisition tools 302a-302d, respectively. Static data plot 308a is a seismic two-way response time and may be the same as seismic trace 202 of FIG. 2A. Static plot 308b is core sample data measured from a core sample of formation 304, similar to core sample 133 of FIG. 2B. Static data plot 308c is a logging trace, similar to well log 204 of FIG. 2C. Production decline curve or graph 308d is a dynamic data plot of the fluid flow rate over time, similar to graph 206 of FIG. 2D. Other data may also be collected, such as historical data, user inputs, economic information, and/or other measurement data and other parameters of interest.

Subterranean structure 304 has a plurality of geological formations 306a-306d. As shown, this structure has several formations or layers, including shale layer 306a, carbonate layer 306b, shale layer 306c, and sand layer 306d. Fault 307 extends through shale layer 306a and carbonate layer 306b. The static data acquisition tools are preferably adapted to take measurements and detect characteristics of the formations.

While a specific subterranean formation with specific geological structures is depicted, it will be appreciated that the oilfield may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in the oilfield, it will be appreciated that one or more types of measurement may be taken at one or more locations across one or more oilfields or other locations for comparison and/or analysis.

The data collected from various sources, such as the data acquisition tools of FIG. 3, may then be processed and/or evaluated. Typically, seismic data displayed in static data plot 308a from data acquisition tool 302a is used by a geophysicist to determine characteristics of the subterranean formations and features. Core data shown in static plot 308b and/or log data from well log 308c are typically used by a geologist to determine various characteristics of the subterranean formation. Production data from graph 308d is typically used by the reservoir engineer to determine fluid flow reservoir characteristics. The data analyzed by the geologist, geophysicist and the reservoir engineer may be analyzed using modeling techniques. Examples of modeling techniques are described in U.S. Pat. No. 5,992,519, WO2004049216, WO1999/064896, U.S. Pat. No. 6,313,837, US2003/0216897, U.S. Pat. No. 7,248,259, US20050149307, and US2006/0197759. Systems for performing such modeling techniques are described, for example, in issued U.S. Pat. No. 7,248,259, the entire contents of which is hereby incorporated by reference.

Figure 4:
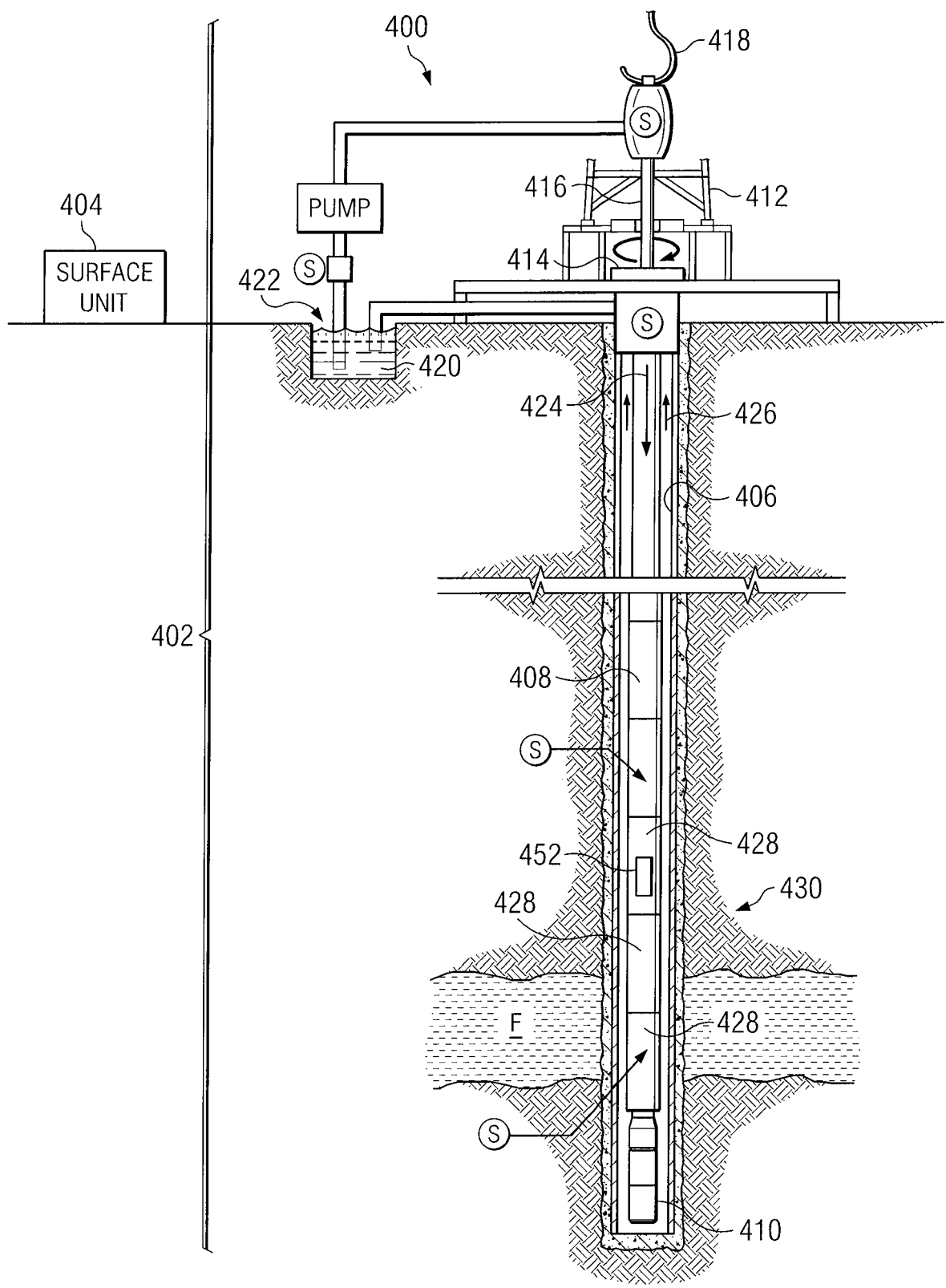
FIG. 4 is a schematic view of a well site, depicting a drilling operation of an oilfield in detail.

FIG. 4 is a schematic view of well site 400, depicting a drilling operation, such as the drilling operation of FIG. 1B, of an oilfield in detail. Well site 400 includes drilling system 402 and surface unit 404. In the illustrated embodiment, borehole 406 is formed by rotary drilling in a manner that is well known. Those of ordinary skill in the art given the benefit of this disclosure will appreciate, however, that the present invention also finds application in drilling applications other than conventional rotary drilling (e.g., mud-motor based directional drilling), and is not limited to land-based rigs.

Drilling system 402 includes drill string 408 suspended within borehole 406 with drill bit 410 at its lower end. Drilling system 402 also includes the land-based platform and derrick assembly 412 positioned over borehole 406 penetrating subsurface formation F. Assembly 412 includes rotary table 414, kelly 416, hook 418, and rotary swivel 419. The drill string 408 is rotated by rotary table 414, energized by means not shown, which engages kelly 416 at the upper end of the drill string. Drill string 408 is suspended from hook 418, attached to a traveling block (also not shown), through kelly 416 and rotary swivel 419 which permits rotation of the drill string relative to the hook.

Drilling system 402 further includes drilling fluid or mud 420 stored in pit 422 formed at the well site. Pump 424 delivers drilling fluid 420 to the interior of drill string 408 via a port in swivel 419, inducing the drilling fluid to flow downwardly through drill string 408 as indicated by directional arrow 424. The drilling fluid exits drill string 408 via ports in drill bit 410, and then circulates upwardly through the region between the outside of drill string 408 and the wall of borehole 406, called annulus 426. In this manner, drilling fluid lubricates drill bit 410 and carries formation cuttings up to the surface as it is returned to pit 422 for recirculation.

Drill string 408 further includes bottom hole assembly (BHA) 430, generally referenced, near drill bit 410 (in other words, within several drill collar lengths from the drill bit). Bottom hole assembly 430 includes capabilities for measuring, processing, and storing information, as well as communicating with surface unit 404. Bottom hole assembly 430 further includes drill collars 428 for performing various other measurement functions.

Sensors S are located about well site 400 to collect data, preferably in real time, concerning the operation of well site 400, as well as conditions at well site 400. Sensors S of FIG. 3 may be the same as sensors S of FIGS. 1A-D. Sensors S of FIG. 3 may also have features or capabilities, of monitors, such as cameras (not shown), to provide pictures of the operation. Sensors S, which may include surface sensors or gauges, may be deployed about the surface systems to provide information about surface unit 404, such as standpipe pressure, hookload, depth, surface torque, and rotary rpm, among others. In addition, sensors S, which include downhole sensors or gauges, are disposed about the drilling tool and/or well bore to provide information about downhole conditions, such as well bore pressure, weight on bit, torque on bit, direction, inclination, collar rpm, tool temperature, annular temperature and toolface, among others. The information collected by the sensors and cameras is conveyed to the various parts of the drilling system and/or the surface control unit.

Drilling system 402 is operatively connected to surface unit 404 for communication therewith. Bottom hole assembly 430 is provided with communication subassembly 452 that communicates with surface unit 404. Communication subassembly 452 is adapted to send signals to and receive signals from the surface using mud pulse telemetry. Communication subassembly 452 may include, for example, a transmitter that generates a signal, such as an acoustic or electromagnetic signal, which is representative of the measured drilling parameters. Communication between the downhole and surface systems is depicted as being mud pulse telemetry, such as the one described in U.S. Pat. No. 5,517,464, assigned to the assignee of the present invention. It will be appreciated by one of skill in the art that a variety of telemetry systems may be employed, such as wired drill pipe, electromagnetic or other known telemetry systems.

Typically, the well bore is drilled according to a drilling plan that is established prior to drilling. The drilling plan typically sets forth equipment, pressures, trajectories and/or other parameters that define the drilling process for the well site. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

Figure 5:
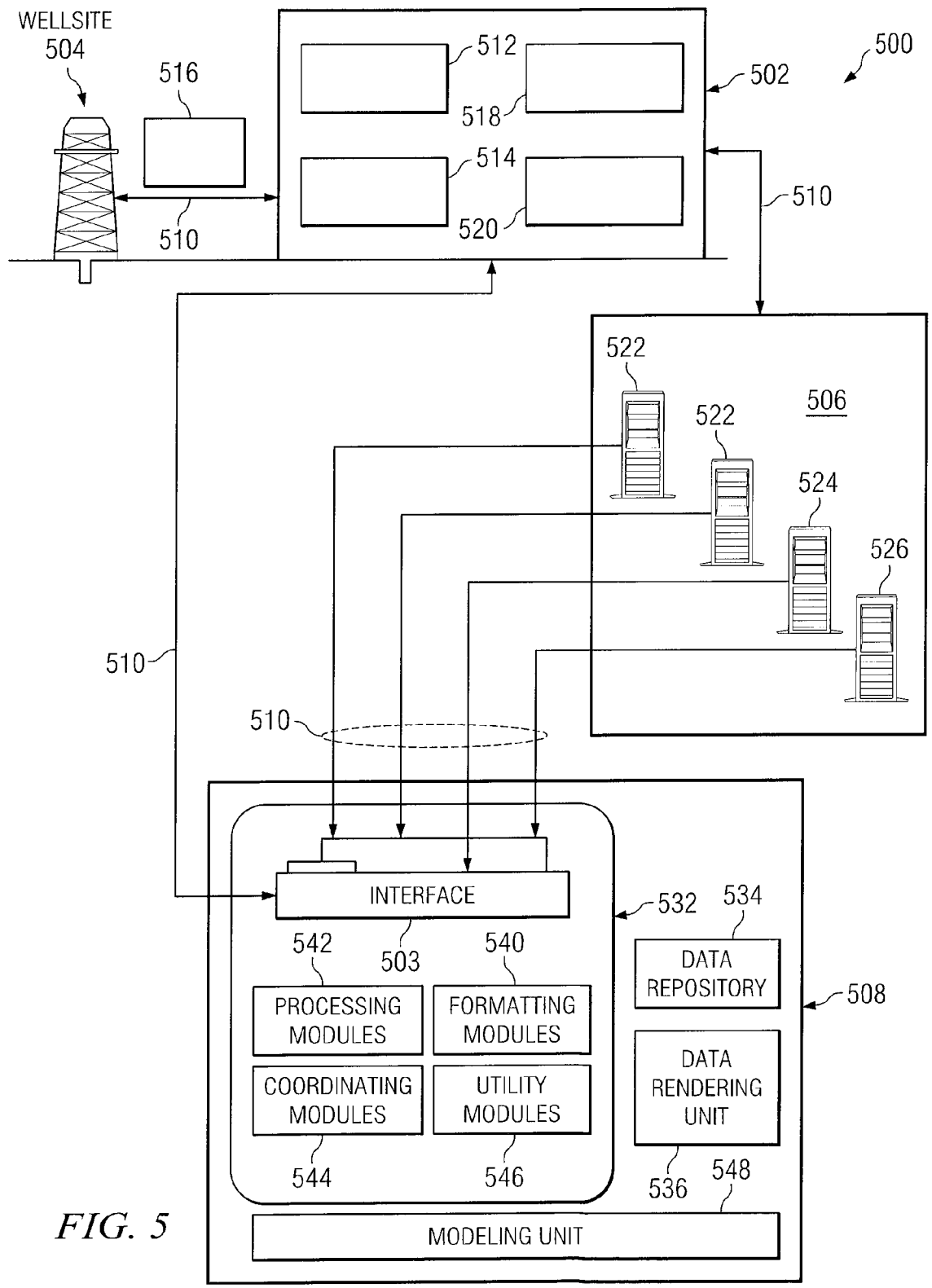
FIG. 5 is a schematic view of a system for performing a drilling operation of an oilfield.

FIG. 5 is a schematic view of system 500 for performing a drilling operation of an oilfield. As shown, system 500 includes surface unit 502 operatively connected to well site 504, servers 506 operatively linked to surface unit 502, and modeling tool 508 operatively linked to servers 506. As shown, communication links 510 are provided between well site 504, surface unit 502, servers 506, and modeling tool 508. A variety of links may be provided to facilitate the flow of data through the system. The communication links may provide for continuous, intermittent, one-way, two-way, and/or selective communication throughout system 500. The communication links may be of any type, such as wired, wireless, etc.

Well site 504 and surface unit 502 may be the same as the well site and surface unit of FIG. 3. Surface unit 502 is preferably provided with an acquisition component 512, controller 514, display unit 516, processor 518 and transceiver 520. Acquisition component 512 collects and/or stores data of the oilfield. This data may be data measured by the sensors S of the well site as described with respect to FIG. 3. This data may also be data received from other sources.

Controller 514 is enabled to enact commands at oilfield 500. Controller 514 may be provided with actuation means that can perform drilling operations, such as steering, advancing, or otherwise taking action at the well site. Drilling operations may also include, for example, acquiring and analyzing oilfield data, modeling oilfield data, managing existing oilfields, identifying production parameters, maintenance activities, or any other actions. Commands may be generated based on logic of processor 518, or by commands received from other sources. Processor 518 is preferably provided with features for manipulating and analyzing the data. The processor may be provided with additional functionality to perform oilfield operations.

Display unit 516 may be provided at well site 504 and/or remote locations for viewing oilfield data. The oilfield data displayed may be raw data, processed data, and/or data outputs generated from various data. The display is preferably adapted to provide flexible views of the data, so that the screens depicted may be customized as desired.

Transceiver 520 provides a means for providing data access to and/or from other sources. Transceiver 520 also provides a means for communicating with other components, such as servers 506, well site 504, surface unit 502, and/or modeling tool 508.

Server 506 may be used to transfer data from one or more well sites to modeling tool 508. As shown, server 506 includes onsite servers 522, remote server 524, and third party server 526. Onsite servers 522 may be positioned at well site 504 and/or other locations for distributing data from surface unit 502. Remote server 524 is positioned at a location away from oilfield 504 and provides data from remote sources. Third party server 526 may be onsite or remote, but is operated by a third party, such as a client.

Servers 506 are preferably capable of transferring drilling data, such as logs, drilling events, trajectory, and/or other oilfield data, such as seismic data, historical data, economics data, or other data that may be of use during analysis. The type of server is not intended to limit the invention. Preferably, system 500 is adapted to function with any type of server that may be employed.

Servers 506 communicate with modeling tool 508 as indicated by communication links 510 there between. As indicated by the multiple arrows, servers 506 may have separate communication links with modeling tool 508. One or more of the servers of servers 506 may be combined or linked to provide a combined communication link.

Servers 506 collect a wide variety of data. The data may be collected from a variety of channels that provide a certain type of data, such as well logs. The data from servers 506 is passed to modeling tool 508 for processing. Servers 506 may be used to store and/or transfer data.

Modeling tool 508 is operatively linked to surface unit 502 for receiving data therefrom. In some cases, modeling tool 508 and/or server(s) 506 may be positioned at well site 504. Modeling tool 508 and/or server(s) 506 may also be positioned at various locations. Modeling tool 508 may be operatively linked to surface unit 502 via server(s) 506. Modeling tool 508 may also be included in or located near surface unit 502.

Modeling tool 508 includes interface 503, processing unit 532, modeling unit 548, data repository 534, and data rendering unit 536. Interface 503 communicates with other components, such as servers 506. Interface 503 may also permit communication with other oilfield or non-oilfield sources. Interface 503 receives the data and maps the data for processing. Data from servers 506 typically streams along predefined channels, which may be selected by interface 503.

As depicted in FIG. 5, interface 503 selects the data channel of server(s) 506 and receives the data. Interface 503 also maps the data channels to data from well site 504. The data may then be passed to the processing unit of modeling tool 508. Preferably, the data is immediately incorporated into modeling tool 508 for real-time sessions or modeling. Interface 503 creates data requests (for example surveys, logs, and risks), displays the user interface, and handles connection state events. It also instantiates the data into a data object for processing.

Processing unit 532 includes formatting modules 540, processing modules 542, coordinating modules 544, and utility modules 546. These modules are designed to manipulate the oilfield data for real-time analysis.

Formatting modules 540 are used to conform data to a desired format for processing. Incoming data may need to be formatted, translated, converted, or otherwise manipulated for use. Formatting modules 540 are configured to enable the data from a variety of sources to be formatted and used so that it processes and displays in real time.

As shown, formatting modules 540 include components for formatting the data, such as a unit converter and the mapping components. The unit converter converts individual data points received from interface 530 into the format expected for processing. The format may be defined for specific units, provide a conversion factor for converting to the desired units, or allow the units and/or conversion factor to be defined. To facilitate processing, the conversions may be suppressed for desired units.

The mapping component maps data according to a given type or classification, such as a certain unit, log mnemonics, precision, max/min of color table settings, etc. The type for a given set of data may be assigned, particularly when the type is unknown. The assigned type and corresponding map for the data may be stored in a file (e.g. XML) and recalled for future unknown data types.

Coordinating modules 544 orchestrate the data flow throughout modeling tool 508. The data is manipulated so that it flows according to a choreographed plan. The data may be queued and synchronized so that it processes according to a timer and/or a given queue size. The coordinating modules include the queuing components, the synchronization components, the management component, modeling tool 508 mediator component, the settings component and the real-time handling component.

The queuing module groups the data in a queue for processing through the system. The system of queues provides a certain amount of data at a given time so that it may be processed in real time.

The synchronization component links certain data together so that collections of different kinds of data may be stored and visualized in modeling tool 508 concurrently. In this manner, certain disparate or similar pieces of data may be choreographed so that they link with other data as it flows through the system. The synchronization component provides the ability to selectively synchronize certain data for processing. For example, log data may be synchronized with trajectory data. Where log samples have a depth that extends beyond the well bore, the samples may be displayed on the canvas using a tangential projection so that, when the actual trajectory data is available, the log samples will be repositioned along the well bore. Alternatively, incoming log samples that are not on the trajectory may be cached so that, when the trajectory data is available, the data samples may be displayed. In cases where the log sample cache fills up before the trajectory data is received, the samples may be committed and displayed.

The settings component defines the settings for the interface. The settings component may be set to a desired format and adjusted as necessary. The format may be saved, for example, in an extensible markup language (XML) file for future use.

The real-time handling component instantiates and displays the interface and handles its events. The real-time handling component also creates the appropriate requests for channel or channel types, and handles the saving and restoring of the interface state when a set of data or its outputs is saved or loaded.

The management component implements the required interfaces to allow the module to be initialized by and integrated for processing. The mediator component receives the data from the interface. The mediator caches the data and combines the data with other data as necessary. For example, incoming data relating to trajectories, risks, and logs may be added to wellbores stored in modeling tool 508. The mediator may also merge data, such as survey and log data.

Utility modules 546 provide support functions to the drilling system. Utility modules 546 include the logging component and the user interface (UI) manager component. The logging component provides a common call for all logging data. This module allows the logging destination to be set by the application. The logging module may also be provided with other features, such as a debugger, a messenger, and a warning system, among others. The debugger sends a debug message to those using the system. The messenger sends information to subsystems, users, and others. The information may or may not interrupt the operation and may be distributed to various locations and/or users throughout the system. The warning system may be used to send error messages and warnings to various locations and/or users throughout the system. In some cases, the warning messages may interrupt the process and display alerts.

The user interface manager component creates user interface elements for displays. The user interface manager component defines user input screens, such as menu items, context menus, toolbars, and settings windows. The user manager may also be used to handle events relating to these user input screens.

Processing module 542 is used to analyze the data and generate outputs. Processing module 542 includes the trajectory management component.

The trajectory management component handles the case when the incoming trajectory information indicates a special situation or requires special handling. The trajectory management component could therefore handle situations where the data pertains to depths that are not strictly increasing or the data indicates that a sidetrack borehole path is being created. For example, when a sample is received with a measured depth shallower than the hole depth, the trajectory module determines how to process the data. The trajectory module may ignore all incoming survey points until the MD exceeds the previous MD on the well bore path, merge all incoming survey points below a specified depth with the existing samples on the trajectory, ignore points above a given depth, delete the existing trajectory data and replace it with a new survey that starts with the incoming survey station, create a new well and set its trajectory to the incoming data, add incoming data to this new well, and prompt the user for each invalid point. All of these options may be exercised in combinations and can be automated or set manually.

Data repository 534 stores the data for modeling unit 548. The data is preferably stored in a format available for use in real-time. The data is passed to data repository 534 from the processing component. It can be persisted in the file system (e.g., as an XML File) or in a database. The system determines which storage is the most appropriate to use for a given piece of data and stores the data there in a manner, which enables automatic flow of the data through the rest of the system in a seamless and integrated fashion. It also facilitates manual and automated workflows—such as modeling, geological, and geophysical—based upon the persisted data.

Data rendering unit 536 provides one or more displays for visualizing the data. Data rendering unit 536 may contain a 3D canvas, a well section canvas or other canvases as desired. Data rendering unit 536 may selectively display any combination of one or more canvases. The canvases may or may not be synchronized with each other during display. The display unit is preferably provided with mechanisms for actuating various canvases or other functions in the system.

While specific components are depicted and/or described for use in the modules of modeling tool 508, it will be appreciated that a variety of components with various functions may be used to provide the formatting, processing, utility, and coordination functions necessary to provide real-time processing in modeling tool 508. The components and/or modules may have combined functionalities.

Modeling unit 548 performs the key modeling functions for generating complex oilfield outputs. Modeling unit 548 may be a conventional modeling tool capable of performing modeling functions, such as generating, analyzing, and manipulating earth models. The earth models typically contain exploration and production data, such as that shown in FIG. 1. In the following detailed description of the preferred embodiments and other embodiments of the invention, reference is made to the accompanying drawings. It is to be understood that those of skill in the art will readily see other embodiments and changes may be made without departing from the scope of the invention.

A method is described for determining an oilfield parameter for a drilling operation in an oilfield, the oilfield having a well site with a drilling tool advanced into a subterranean formation with geological structures and reservoirs therein. A first set of decision factors and a second set of decision factors about the drilling operation are identified. Each of the first set of decision factors is contained within a first set of nodes, and each of the second set of decision factors is contained within a second set of nodes. Both the first set of nodes and the second set of nodes contain a set of common nodes, which are common to both the first and second sets. The first set of nodes is associated to create a first belief network and the second set of nodes is associated to create a second belief network. Then, the set of common nodes of the first belief network is associated with the set of common nodes of the second belief network to form a multinet belief network. Oilfield parameters can be generated from the multinet belief network.

Figure 6:
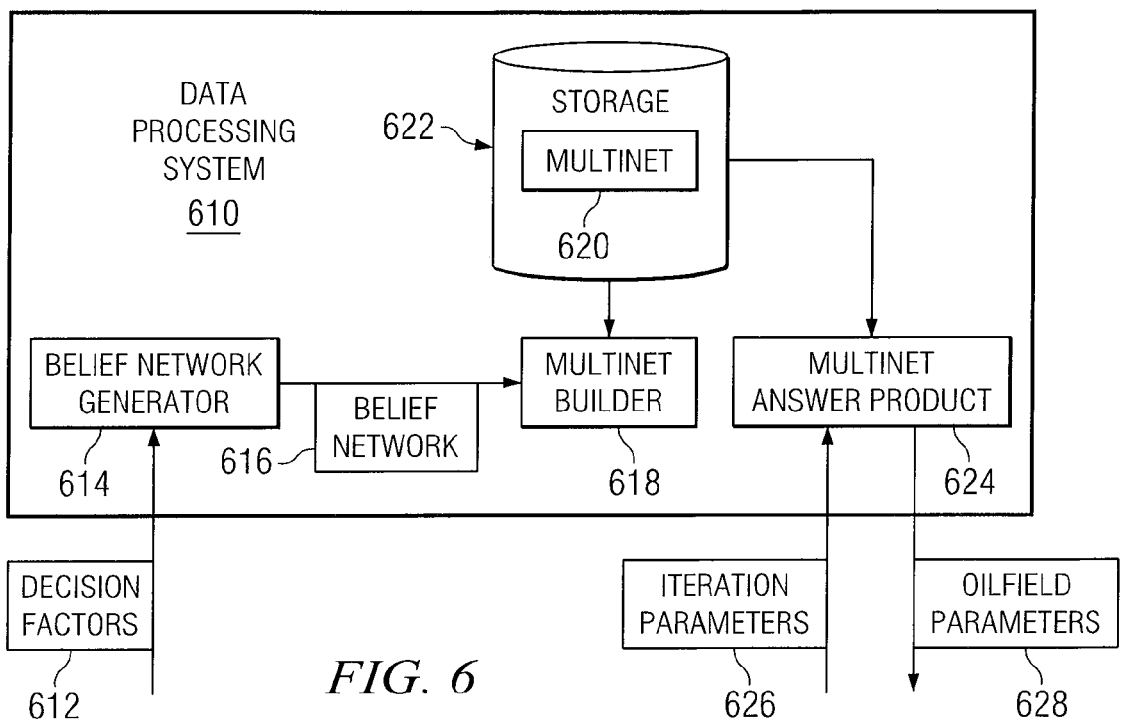
FIG. 6 is a flow diagram depicting the flow of information through various components according to an illustrative embodiment.

Referring now to FIG. 6, a flow diagram depicting the flow of information through various components is shown according to an illustrative embodiment. Data processing system 610 can be system 500 of FIG. 5.

In theses illustrative examples, decision factors 612 are entered into belief network generator 614. Decision factors 612 are a set of causal variables that are considered when arriving at a conclusion. A causal variable is a factor that might be considered when arriving at a conclusion. A set as used herein refers to one or more items. For example, a set of causal variables are one or more causal variables Decision factors 612 can also be those conclusions that can be ascertained from the set of causal variables. Decision factors 612 generally relate to a condition encountered in a drilling operation, and a remedial action that can be performed in response to that condition. Decision factors 612 can be obtained from surveys, questionnaires, data logs, or other sources of information.

Decision factors 612 are entered into a belief network generator 614. Belief network generator 614 is a software process executing on data processing system 610. Belief network generator 614 assigns each of decision factors 612 that are entered into a node. Belief network generator 612 then causally associates the generated nodes to form belief network 616.

Belief network 616 is used to compensate for the inherent uncertainty in knowledge based applications such as well site troubleshooting. Belief network 616 is a problem, or set of problems, that is modeled as a set of nodes interconnected with pathways to form a directed acyclic graph. Each node within belief network 616 represents a random variable, or uncertain quantity, which can take two or more possible values. The pathways signify the existence of direct influences between the linked variables.

The various nodes of the belief network are associated in a cause/effect arrangement. Each node containing a causal variable input, a causal node, from decision factors 612 is located upstream from a conclusion. By weighing the various upstream nodes, belief network 616 is able to generate a conclusion from those nodes. A conclusion node is a node of belief network 616 that contains the conclusion generated from the weighting of the associated causal nodes.

Conclusion nodes themselves may be causal nodes for a subsequent downstream conclusion. For example, a first node is a conclusion node for a set of causal nodes. That first node may itself be one of a second set of causal nodes that feed into a second node, the second node being a conclusion node for the second set of causal nodes.

Various nodes of belief network can be connected using an interactive template having a graphical user interface. The interactive template can present the user with the set of nodes and allow the user to connect the nodes in the desired fashion. A user can then associate the nodes in a desired fashion to create the desired cause/effect relationship between the various nodes of belief network 616. It is appreciated that the described method of utilizing a graphical user interface is simply one illustrated method of associating the various nodes to create belief network 616. Other methods, such as a parse of decision factors 612, language recognition of decision factors 612, or other methods of classifying and connecting various decision factors 612 input into belief network generator 614 can also be utilized.

Once belief network generator 614 has generated belief network 616 from decision factors 612, belief network generator 614 forwards belief network 616 to multinet builder 618. Multinet builder 618 is a software component executing on data processing system 610 that connects common nodes of separate belief networks, such as belief network 616, to form multinet belief network 620.

When multinet builder 618 receives belief network 616 from belief network generator 614, multinet builder 618 parses belief network 616 to determine the contents of each node contained therein. The contents of the nodes are those decision factors 612 that were entered into belief network generator 614.

Multinet builder 618 identifies a current version of multinet 620 from associated data storage 622. Multinet 620 is a combination of previous separate belief networks, such as belief network 616. Common nodes among the separate belief networks are associated. Common nodes are nodes of different belief networks, or nodes contained in a current multinet iteration, that contain identical or substantially similar decision factors, such as decision factors 612.

Multinet builder 618 parses multinet 620 to determine the contents of each node contained therein. The contents of the nodes are those decision factors, such as decision factors 612 that are previously entered into and incorporated into a belief network 616 by belief network generator 614.

Multinet builder 618 then compares the parsed nodes from belief network 616 and the parsed nodes from multinet 620 to identify common nodes. Common nodes among the separate belief networks are associated. Common nodes are nodes of different belief networks, or nodes contained in a current multinet iteration, that contain identical or substantially similar decision factors, such as decision factors 612. Common nodes can also be identified and connected manually by a user utilizing a graphical user interface.

Once common nodes between belief network 616 and multinet 620 are identified, multinet builder 618 then associates the generated nodes to create an updated version of multinet 620. Common nodes in belief network 616 and multinet 620 and are overlapped, so that conclusion nodes of belief network 616 and multinet 620 can be affected by each other's causal nodes. In this manner, separate belief networks having separate or different causal nodes can be effectively combined into a multinet. Further, causal nodes that may affect more than one decision node can be combined into a unified decision model contained in multinet 620.

When common nodes have been associated, multinet builder 618 saves the updated version of multinet 620 to associated data storage 622. Multinet 620 is then available as a diagnostic or predictive analysis tool for generating oil filed parameters in response to a query by an operator or engineer.

Multinet answer product 624 receives iteration parameters 626 from an operator or engineer. Multinet answer product 624 is a software component executing data processing system 610. Iteration parameters 626 are observed conditions in an oilfield that relate to one or more conclusions. Iteration parameters 626 correspond to at least one decision factor, such as decision factor 612, contained within a node of multinet 620.

Responsive to receiving iteration parameters 626, multinet answer product 624 identifies multinet 620 from storage 622. Multinet answer product 624 then inputs iteration parameters into the corresponding nodes of multinet 620 to generate oilfield parameters 628. Oilfield parameters 628 are typically those conclusions from conclusion nodes in multinet 620.

Multinet answer product 624 then forwards oilfield parameters 628 to the operator or engineer, who can utilize oilfield parameters 628 in performing drilling operations at a well site, such as well site 400 of FIG. 4.

Figure 7:
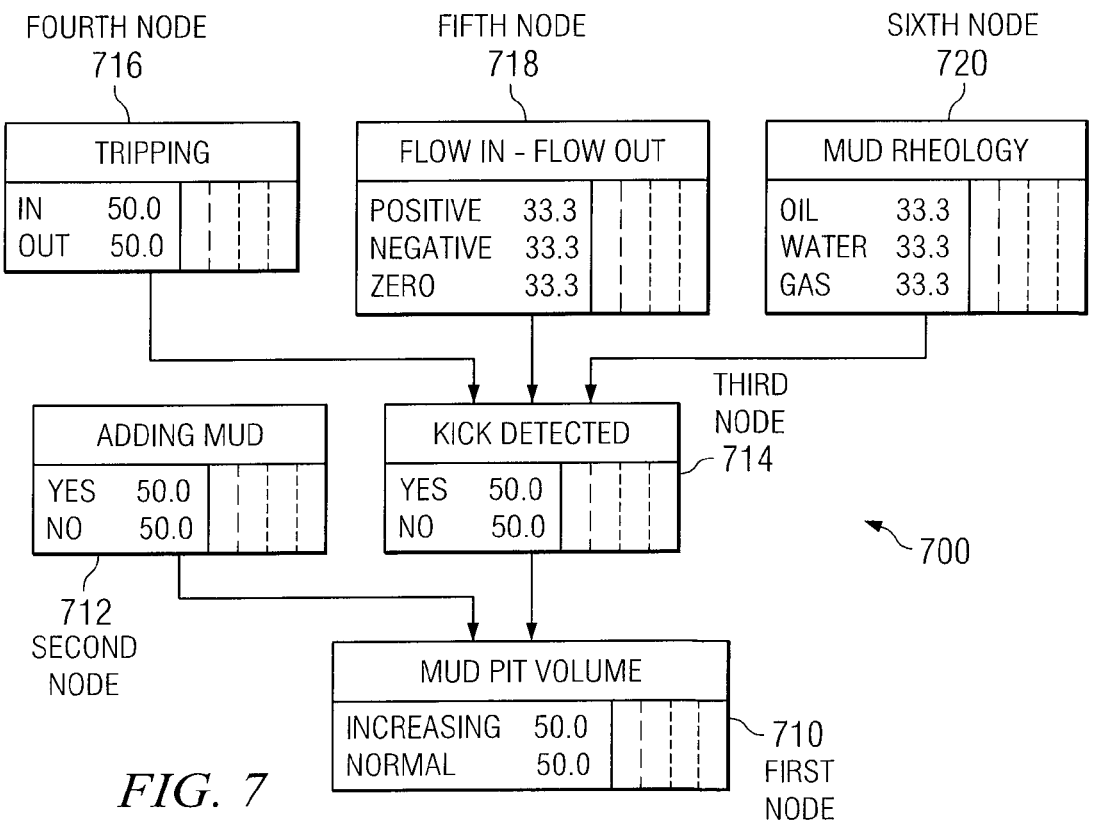
FIG. 7 is a first belief network for determining oilfield parameters according to an illustrative embodiment.

Referring now to FIG. 7, a first belief network for determining oilfield parameters is shown according to an illustrative embodiment. Belief network 700 is a belief network, such as belief network 616 of FIG. 6.

First node 710 is titled "Mud Pit Volume." First node 710 is a conclusion type node, having two causal nodes, second node 712, and third node 714, located upstream therefrom. First node 710 contains two observed parameters that relate to the volume of the mud pit: "increasing" and "decreasing." The mud pit itself is a large tank that holds drilling fluid on the rig or at a mud-mixing plant. Whether the volume of mud within the mud pit is increasing or decreasing can be related to several phenomena.

Second node 712 is titled "Adding Mud." Second node 712 is a causal node that is associated with first node 710. Second node 712 contains two observed parameters that relate to adding mud: "yes" and "no." Whether mud is therefore being added to a mud pit is therefore a cause of a change in the mud pit volume, as indicated at first node 710. Second node 712 is therefore a causal node of first node 710.

Third node 714 is titled "Kick Detected." Third node 714 is a causal node that is associated with first node 710. Third node 714 contains two observed parameters that relate to whether a kick is detected: "yes" and "no." Whether a kick is detected can be a cause of a change in the mud pit volume, as indicated at first node 710. Third node 714 is therefore a causal node of first node 710.

Third node 714 is also a conclusion type node having three causal nodes, fourth node 716 and fifth node 718, and sixth node 720, located upstream therefrom. Third node 714 contains two observed parameters that relate to whether a kick is detected: "yes" and "no." A kick is a flow of reservoir fluids, such as drilling mud, into the well bore during drilling operations. Whether a kick has occurred can be related to several phenomena. The kick is physically caused by the pressure in the well bore being less than that of the formation fluids, thus causing flow. The condition of a lower well bore pressure than the formation pressure is caused in two ways: First, if the mud weight is too low, then the hydrostatic pressure exerted on the formation by the fluid column may be insufficient to hold the formation fluid in the formation. This can happen if the mud density is suddenly lightened or is not to specification to begin with, or if a drilled formation has a higher pressure than anticipated. This type of kick might be called an underbalanced kick. The second way a kick can occur is if dynamic and transient fluid pressure effects, usually due to motion of the drillstring or casing, effectively lower the pressure in the well bore below that of the formation. This second kick type could be called an induced kick.

While third node 714 is shown as having the conclusion "kick detected", this conclusion is exemplary. The described embodiments can be used to determine other conclusions, including, but not limited to, hole cleaning, sticking, borehole analysis design, trajectory design, whirl, vibration, shock, stability, tendency, bit design, bit selection, offset correlation, kick detection, swab/surge, motor efficiency, drilling automation, positional uncertainty, and survey program detection.

Fourth node 716 is titled "Tripping." Fourth node 716 is a causal node that is associated with third node 714. Fourth node 716 contains two observed parameters that relate to adding mud: "in" and "out." Tripping is the act of pulling the drillstring out of the hole or replacing it in the hole. Whether pipe is being tripped into, or out of the well bore can therefore be a causal factor in the occurrence of a kick detected, as indicated at third node 714. Fourth node 716 is therefore a causal node of third node 714.

Fifth node 718 is titled "Flow In-Flow Out." Fifth node 718 is a causal node that is associated with third node 714. Fifth node 718 contains three observed parameters that relate fluid flow in the fluid return line from a well: "positive," "negative," and "zero." Whether fluid has a positive, negative, or zero flow through the fluid return line can therefore be a causal factor in the occurrence of a kick detected, as indicated at third node 714. Fifth node 718 is therefore a causal node of third node 714.

Sixth node 720 is titled "Mud Rheology." Sixth node 720 is a causal node that is associated with third node 714. Sixth node 720 contains three observed parameters that relate to the composition of the drilling mud: "oil," "water," and "gas." If the mud weight is too low, then the hydrostatic pressure exerted on the formation by the fluid column may be insufficient to hold the formation fluid in the formation. This can happen if the mud density is suddenly lightened or is not to specification to begin with, or if a drilled formation has a higher pressure than anticipated. The composition and rheology of the mud can therefore be a causal factor in the occurrence of a kick detected, as indicated at third node 714. Sixth node 720 is therefore a causal node of third node 714.

Figure 8:
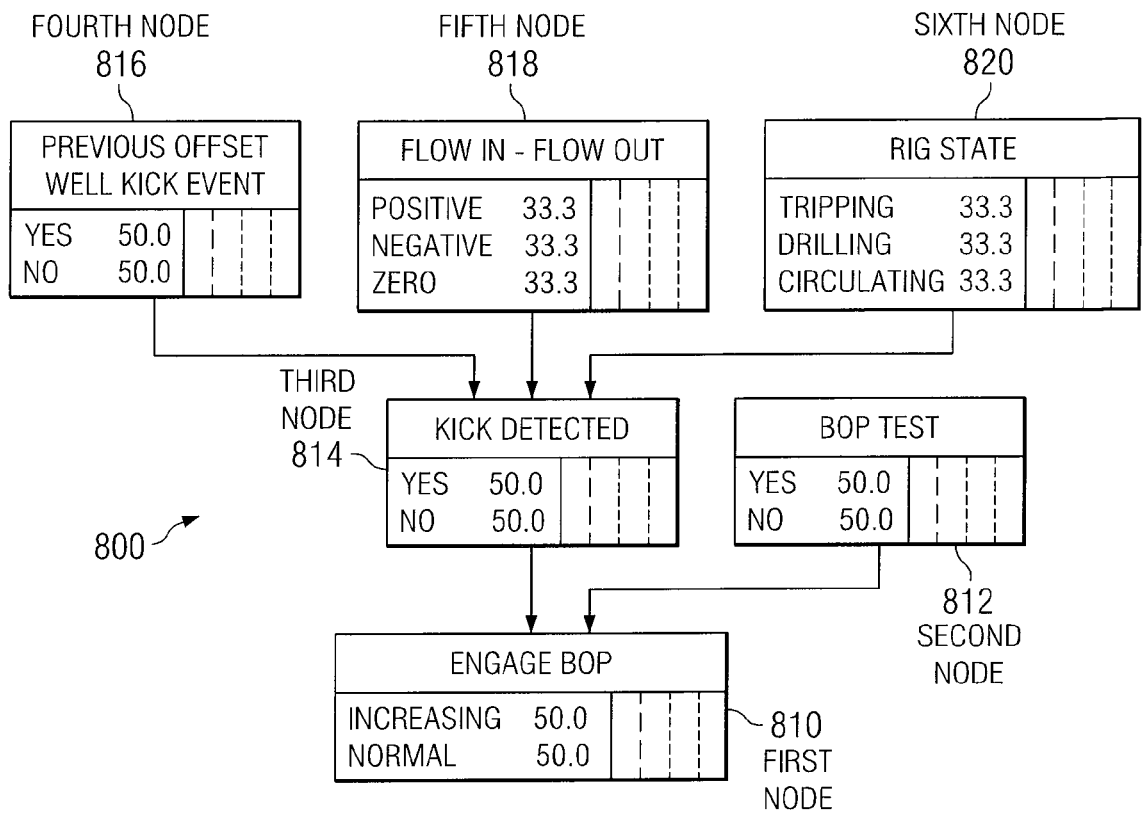
FIG. 8 is a second belief network for determining oilfield parameters according to an illustrative embodiment.

Referring now to FIG. 8, a second belief network for determining oilfield parameters is shown according to an illustrative embodiment. Belief network 800 is a belief network, such as belief network 616 of FIG. 6.

First node 810 is titled "Engage BOP." A "BOP" is a blow out prevention device, designed to prevent the uncontrolled flow of reservoir fluids into the well bore or to the surface. First node 810 is a conclusion type node, having two causal nodes, second node 812 and third node 814, located upstream therefrom. First node 810 contains two observed parameters that relate to the volume of the mud pit: "increasing" and "normal." A decision of whether a "BOP" should be engaged can be related to several phenomena.

Second node 812 is titled "BOP Test." Second node 812 is a causal node that is associated with first node 810. Second node 812 contains two observed parameters that relate to whether a BOP Test is being performed: "yes" and "no." Whether a BOP Test is being performed is therefore a factor in determining whether to engage the BOP, as indicated at first node 810. Second node 812 is therefore a causal node of first node 810.

Third node 814 is titled "Kick Detected." Third node 814 is a causal node that is associated with first node 810. Third node 814 contains two observed parameters that relate to whether a kick is detected: "yes" and "no." Whether a kick is detected is therefore a factor in determining whether to engage the BOP, as indicated at first node 810. Third node 814 is therefore a causal node of first node 810.

Third node 814 is also a conclusion type node having three causal nodes, fourth node 816 and fifth node 818, and sixth node 820, located upstream therefrom. Third node 814 contains two observed parameters that relate to whether a kick is detected: "yes" and "no." A kick is a flow of reservoir fluids, such as drilling mud, into the well bore during drilling operations. Whether a kick has occurred can be related to several phenomena. The kick is physically caused by the pressure in the well bore being less than that of the formation fluids, thus causing flow. The condition of a lower well bore pressure than the formation pressure is caused in two ways: First, if the mud weight is too low, then the hydrostatic pressure exerted on the formation by the fluid column may be insufficient to hold the formation fluid in the formation. This can happen if the mud density is suddenly lightened or is not to specification to begin with, or if a drilled formation has a higher pressure than anticipated. This type of kick might be called an underbalanced kick. The second way a kick can occur is if dynamic and transient fluid pressure effects, usually due to motion of the drillstring or casing, effectively lower the pressure in the well bore below that of the formation. This second kick type could be called an induced kick.

Fourth node 816 is titled "Previous Offset Well Kick Event." Fourth node 816 is a causal node that is associated with third node 814. Fourth node 816 contains two observed parameters that relate to whether a kick event has been previously observed in an offset well: "yes" and "no." A previous kick event in an offset well can cause motion of the drillstring or casing in related wells, causing a secondary kick in those offset wells. Fourth node 816 is therefore a causal node of third node 814.

Fifth node 818 is titled "Flow In-Flow Out." Fifth node 818 is a causal node that is associated with third node 814. Fifth node 818 contains three observed parameters that relate fluid flow in the fluid return line from a well: "positive," "negative," and "zero." Whether fluid has a positive, negative, or zero flow through the fluid return line can therefore be a causal factor in the occurrence of a kick detected, as indicated at third node 814. Fifth node 818 is therefore a causal node of third node 814.

Sixth node 820 is titled "Rig State." Sixth node 820 is a causal node that is associated with third node 814. Sixth node 820 contains three observed parameters that relate the operation state of a rig: "Tripping," "Drilling," and "Circulating." The probability of a kick occurring can be higher or lower, depending on the operation state of the rig. Therefore, the operational state of the rig can be a causal factor in the occurrence of whether a kick is detected, as indicated at third node 814. Sixth node 820 is therefore a causal node of third node 814.

Figure 9:
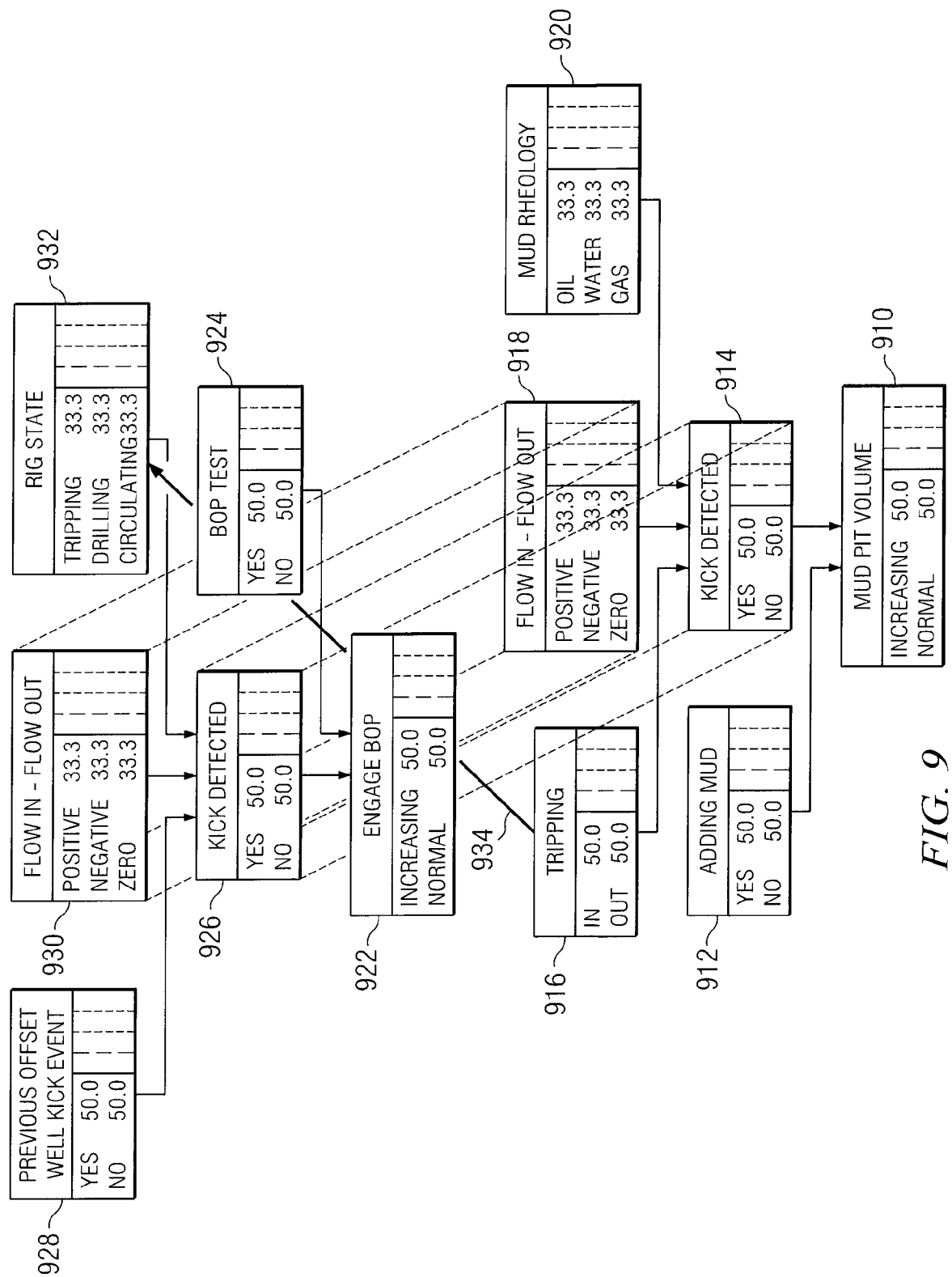
FIG. 9 is a multinet for determining oilfield parameters according to an illustrative embodiment.

Referring now to FIG. 9, a multinet for determining oilfield parameters is shown according to an illustrative embodiment. Multinet 900 is a multinet belief network, such as multinet 620 of FIG. 6. Multinet 900 is a multinet created by combining belief network 700 of FIG. 7 and belief network 800 of FIG. 8.

Nodes 910-920 are first node 710, second node 712, third node 714, fourth node 716, fifth node 718, and sixth node 720 of FIG. 7, respectively. Nodes 922-932 are first node 810, second node 812, third node 814, fourth node 816, fifth node 818, and sixth node 820 of FIG. 8, respectively. The two belief networks combined into multinet 900 are shown as a simplistic illustration for ease in understanding the described embodiments. A multinet can contain any number of belief networks, having common nodes that are combined as herein described. Common nodes need not be common among all of the belief networks. A common node need only encompass at least two of the combined belief networks.

Node 914 and node 926 form a first set of common nodes. Nodes 918 and 930 form a second set of common nodes. Common nodes are nodes of separate belief networks, or nodes contained in a current multinet iteration, that contain identical or substantially similar decision factors, such as decision factors 612 of FIG. 6. Common nodes among the separate belief networks are associated, effectively linking belief network 700 of FIG. 7 and belief network 800 of FIG. 8 into a single multinet.

By associating nodes into a set of common nodes, the causal nodes of one belief network can affect the conclusion nodes of a separate belief network. With respect to FIG. 9, node 916, node 918, and node 920 can be used as causal nodes to conclusion node 926 and subsequently to node 922, despite these nodes being previously unassociated before creation of multinet 900. Likewise, node 928, node 930, and node 932 can be used as causal nodes to conclusion node 914, and subsequently to conclusion node 910, despite these nodes being previously unassociated before creation of multinet 900.

Node 916 is fourth node 716 of FIG. 7. Node 916 is titled "Tripping." Node 916 is a causal node that is associated with node 914. Because node 914 is part of a set of common nodes with node 926, node 916 can also be a causal node to node 922 that is associated with node 926.

Node 932 is sixth node 820 of FIG. 8. Node 932 is titled "Rig State." Node 932 contains three observed parameters that relate the operation state of a rig: "Tripping," "Drilling," and "Circulating." The "Tripping" parameter of Node 932 is an operational state of the rig. Further, the "Tripping" parameter of node 932 is the same "Tripping" that is observed at node 916. Multinet 900 therefore creates an association 934 between node 916 and node 932. After association 934 has been created, a perturbation of node 916 will affect node 932. Node 916 has therefore effectively become a causal node to node 932.

Figure 10:
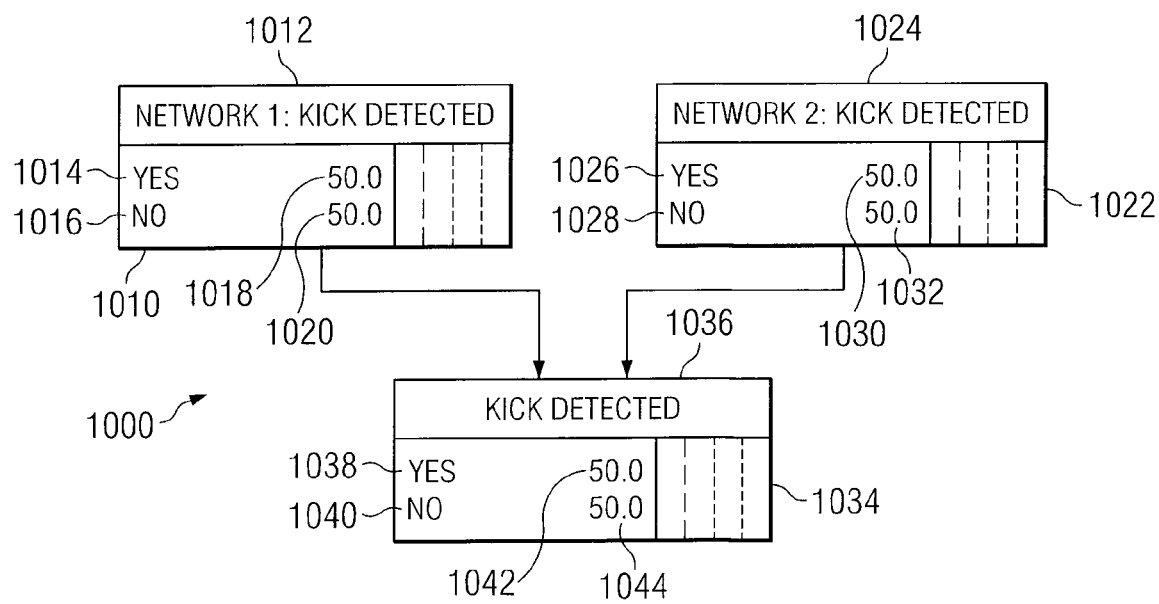
FIG. 10 is a combination process for associating a common set of nodes according to an illustrative embodiment.

Referring now to FIG. 10, a combination process for associating a common set of nodes is shown according to an illustrative embodiment. Multinet 1000 is a multinet belief network, such as multinet 620 of FIG. 6. Multinet 1000 is a multinet created by combining belief network 700 of FIG. 7 and belief network 800 of FIG. 8.

Node 1010 is third node 714 of FIG. 7. Node 1010 has title 1012 "Network 1: Kick Detected." Node 1010 contains two observed parameters that relate to whether a kick is detected: "yes" 1014 and "no" 1016. Associated with each of the two observed parameters is a probability indicator. In these simple examples, the probability indicator is simply a non-weighted probability, in which each of the observed parameters has an equal probability of occurring. Therefore, the probability indicator for "yes" 1014 is 50.0 1018, and the probability indicator for "no" 1016 is 50.0 1020. It is appreciated that this is one example of a probability indicator. If an operator or engineer should wish to assign a greater weight to one of the probability indicators, the probability indicators could be adjusted to reflect the greater probability being assigned thereto.

Node 1022 is third node 814 of FIG. 8. Node 1022 has title 1024 "Network 2: Kick Detected." Node 1022 contains two observed parameters that relate to whether a kick is detected: "yes" 1026 and "no" 1028. Associated with each of the two observed parameters is a probability indicator. In these simple examples, the probability indicator is simply a non-weighted probability, in which each of the observed parameters has an equal probability of occurring. Therefore, the probability indicator for "yes" 1026 is 50.0 1030, and the probability indicator for "no" 1028 is 50.0 1032. It is appreciated that this is one example of a probability indicator. If an operator or engineer should wish to assign a greater weight to one of the probability indicators, the probability indicators could be adjusted to reflect the greater probability being assigned thereto.

Node 1034 is association representing the set of common nodes 1010 and 1022. Common nodes are nodes of separate belief networks, or nodes contained in a current multinet iteration, that contain identical or substantially similar decision factors. By associating nodes into a set of common nodes, the causal nodes of one belief network can affect the conclusion nodes of a separate belief network.

Node 1034 has title 1036 "Kick Detected." Node 1034 contains two observed parameters that relate to whether a kick is detected: "yes" 1038 and "no" 1040. Observed parameters "yes" 1038 and "no" 1040 are a combination of the observed parameters of node 1010 and node 1022. Associated with each of the two observed parameters is a probability indicator. The probability indicator for "yes" 1038 is 50.0 1042, and the probability indicator for "no" 1040 is 50.0 1044. Probability indicators in node 1034 are a combination of the probability indicators of node 1022 and node 1034. In this simple example, each of the belief networks of FIG. 7 and FIG. 8 is given an identical degree of certainty. A degree of certainty is a measure of the confidence that an operator or engineer has in the predicted outcome from a certain belief network, or certain node within a belief network. In this example, because node 1010 and node 1022 have an identical degree of certainty, the probability indicators in node 1034 are simply a non-weighted probability, in which each of the observed parameters has an equal probability of occurring. If an operator or engineer should wish to assign a greater degree of certainty to one belief network, the probability indicators could be adjusted to reflect the greater degree of certainty in the associated network.

Figure 11:
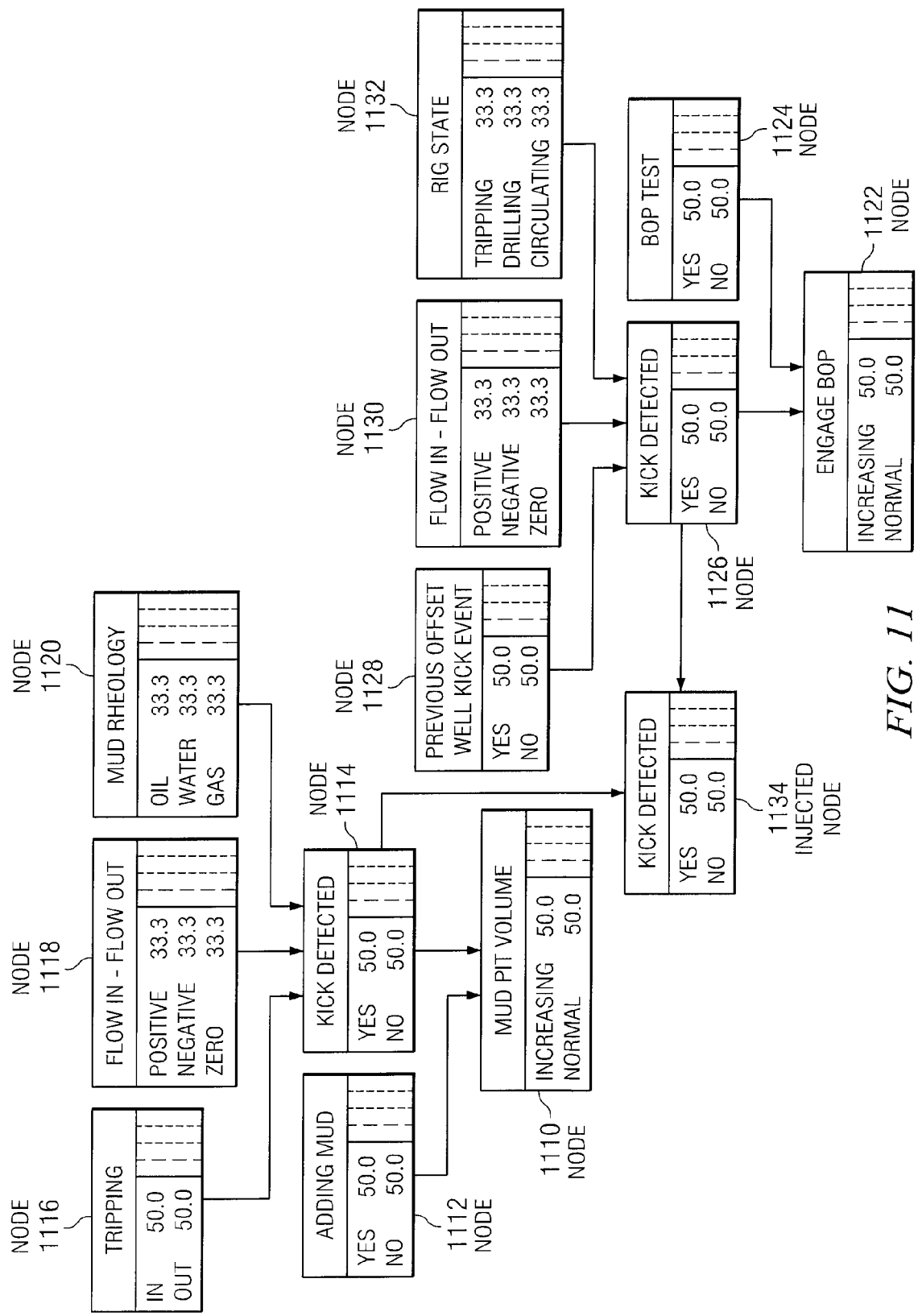
FIG. 11 is a combination process for assigning a degree of certainty to a particular outcome from a belief network in a multinet according to an illustrative embodiment.

Referring now to FIG. 11, a node-injected multinet for determining oilfield parameters is shown according to an illustrative embodiment. Node injected multinet 1100 is a multinet belief network, such as multinet 620 of FIG. 6. Node injected multinet 1100 is a multinet created by combining belief network 700 of FIG. 7 and belief network 800 of FIG. 8.

Node injected multinet 1100 is a multinet that utilizes an injected node to link common nodes of separate belief networks. The separate belief networks combined into node injected multinet 1100 are then altered to respond to the injected node, rather than the shared common node.

Nodes 1110-1120 are first node 710, second node 712, third node 714, fourth node 716, fifth node 718, and sixth node 720 of FIG. 7, respectively. Nodes 1122-1132 are first node 810, second node 812, third node 814, fourth node 816, fifth node 818, and sixth node 820 of FIG. 8, respectively. The two belief networks combined into node injected multinet 1100 are shown as a simplistic illustration for ease in understanding the described embodiments. A node injected multinet can contain any number of belief networks, having common nodes that are combined as herein described. Common nodes need not be common among all of the belief networks. A common node need only encompass at least two of the combined belief networks.

Node 1114 and node 1126 form a first set of common nodes. Common nodes are nodes of separate belief networks, or nodes contained in a current multinet iteration, that contain identical or substantially similar decision factors, such as decision factors 612 of FIG. 6. Common nodes among the separate belief networks are associated, effectively linking belief network 700 of FIG. 7 and belief network 800 of FIG. 8 into a single multinet.

Node 1114 and node 1126 are linked by injected node 1134. An injected node is the combined determination of the immediate upstream nodes. For example, injected node 1134 is the combined determination of a "Kick Detected" as determined by the combination of nodes 1114 and 1126.

Figure 12:
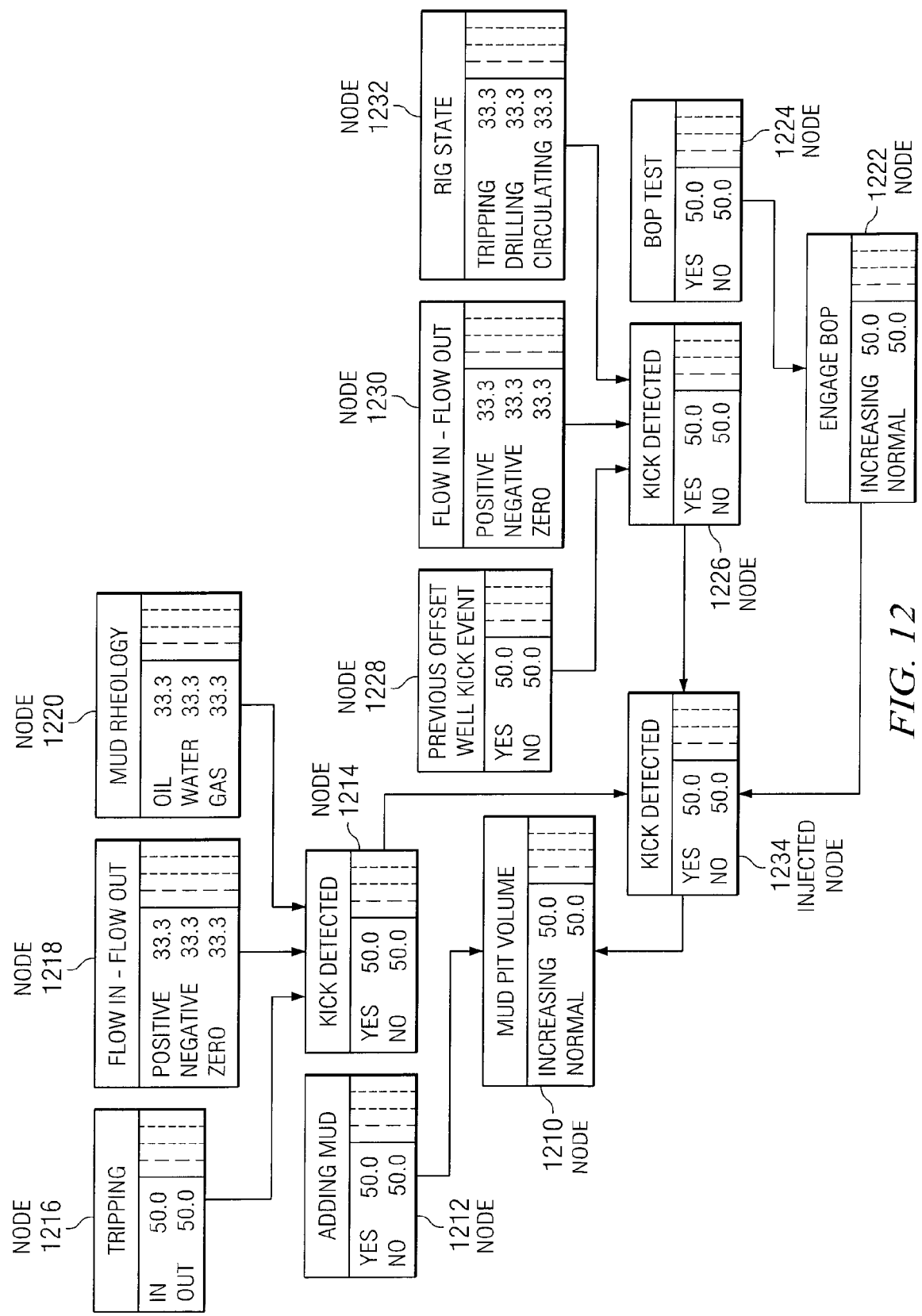
FIG. 12 is a flowchart of the processing steps for generating an oilfield parameter according to an illustrative embodiment.

Referring now to FIG. 12, a node-injected multinet for determining oilfield parameters is shown according to an illustrative embodiment. Node injected multinet 1200 is node injected multinet 1100 of FIG. 11. Node injected multinet 1200 is causally linked, allowing the determinations of separate belief networks to influence the determinations of other belief networks.

Nodes 1210-1220 are node 1110, node 1112, node 1114, node 1116, node 1118, and node 1120 of FIG. 11, respectively. Nodes 1222-1232 are node 1222, node 1224, node 1226, node 1228, node 1230, and node 1232 of FIG. 11, respectively. The two belief networks combined into node injected multinet 1100 are shown as a simplistic illustration for ease in understanding the described embodiments. A node injected multinet can contain any number of belief networks, having common nodes that are combined as herein described. Common nodes need not be common among all of the belief networks. A common node need only encompass at least two of the combined belief networks.

Node 1214 and node 1226 form a first set of common nodes. Common nodes are nodes of separate belief networks, or nodes contained in a current multinet iteration, that contain identical or substantially similar decision factors, such as decision factors 612 of FIG. 6. Common nodes among the separate belief networks are associated, effectively linking belief network 700 of FIG. 7 and belief network 800 of FIG. 8 into a single multinet.

Node 1214 and node 1226 are linked by injected node 1234. An injected node is the combined determination of the immediate upstream nodes. For example, injected node 1234 is the combined determination of a "Kick Detected" as determined by the combination of nodes 1214 and 1226.

The direct association between node 1214 and node 1210, shown in FIG. 11 as node 1114 and node 1110, has been disassociated. Likewise, the direct association between node 1226 and node 1222, shown in FIG. 11 as node 1126 and node 1122, has been disassociated. Replacing those associations is an association from node 1212 to injected node 1234, and from node 1226 to injected node 1234. Injected node 1234 is the combined determination of node 1214 and node 1226. A new direct association between injected node 1234 and node 1210 is then created. Similarly, a new direct association between injected node 1234 and node 1222 is then created.

By disassociating the direct link between node 1214 and node 1210, node 1210 is no longer directly affected by node 1214. The association from node 1214 to injected node 1234, and finally to node 1210 ensures that the conclusion of node 1210 is affected by each belief network that is connected to injected node 1234. Node 1210 is therefore affected by nodes 1228-1232.

By disassociating the direct link between node 1226 and node 1222, node 1222 is no longer directly affected by node 1226. The association from node 1226 to injected node 1234, and finally to node 1222 ensures that the conclusion of node 1210 is affected by each belief network that is connected to injected node 1234. Node 1222 is therefore affected by nodes 1216-1220.

Figures 13, 14:
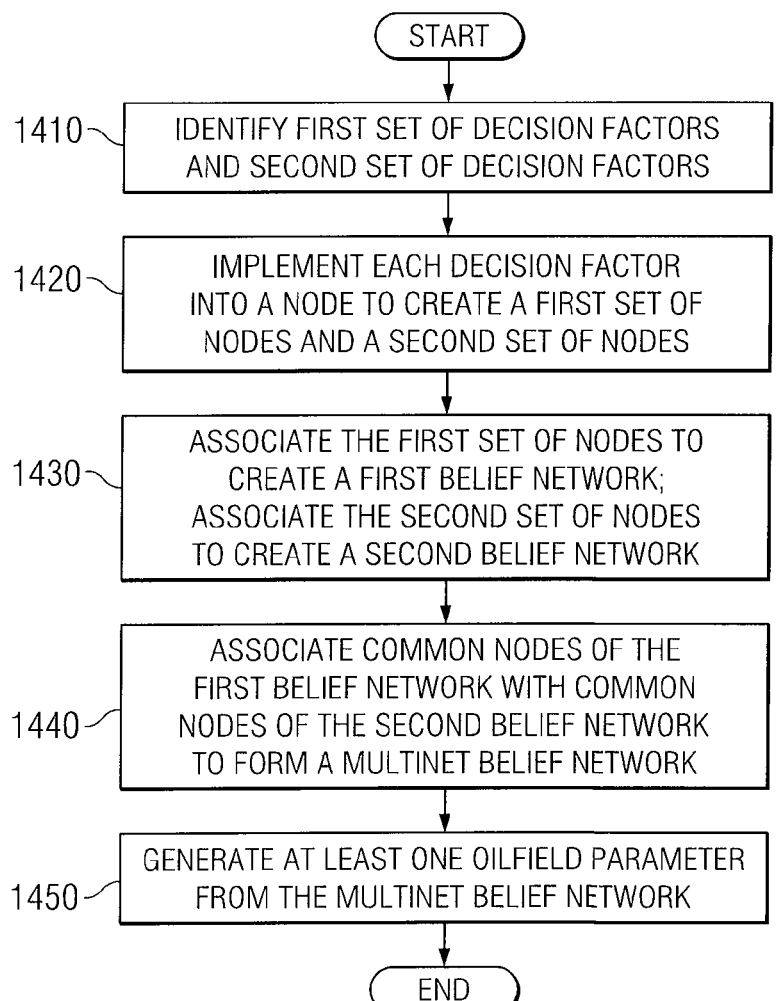
FIG. 13 is a flowchart of the processing steps for generating a belief network according to an illustrative embodiment.
FIG. 14 is a flowchart of the processing steps for generating a multinet belief network according to an illustrative embodiment.

Referring now to FIG. 13, a combination process for assigning a degree of certainty to a particular outcome from a belief network in a multinet is shown according to an illustrative embodiment. Table 1300 depicts the various combination outcomes for the observed parameters of a common node of the belief networks, and the predictive outcome of whether the outcome has occurred based on those observed parameters. Table 1300 reflects a relative degree of certainty between the various belief networks, such as belief network 700 of FIG. 7 and belief network 800 of FIG. 8, in arriving at a determination of whether an outcome has occurred based on the observed parameters of the multinet.

In situation 1 1310, first network determination 1312 is "yes" for whether a kick has occurred. Second network determination 1314 is also "yes" for whether a kick has occurred. The first and second network determinations are based on the inputs from the causal nodes into their related conclusion node, as described in FIGS. 7-10 above.

Because of the congruence of first network determination 1312 and second network determination 1314, the multinet can determine with a high degree of certainty that the predicted outcome, i.e., a kick, has actually occurred. Therefore, multinet determination 1316 presents the probabilistic outcome that a kick has actually occurred with 99% certainty.

In situation 2 1318, first network determination 1312 is "yes" for whether a kick has occurred. However, second network determination 1314 is "no" for whether a kick has occurred. The first and second network determinations are based on the inputs from the causal nodes into their related conclusion node, as described in FIGS. 7-10 above.

Because of the incongruence of first network determination 1312 and second network determination 1314, the multinet cannot determine with a high degree of certainty that the predicted outcome, i.e., a kick, has actually occurred. Therefore, multinet determination 1316 presents the probabilistic outcome that a kick has actually occurred with only 70% certainty. Because multinet determination 13116 still predicts that the predicted outcome, i.e., a kick, has still occurred, multinet determination 1316 has shown a preference of first network determination 1312 over second network determination 1314. Multinet determination 1316 therefore has a greater degree of certainty in the determined outcome from first network determination 1312.

In situation 3 1320, first network determination 1312 is "no" for whether a kick has occurred. However, second network determination 1314 is "yes" for whether a kick has occurred. The first and second network determinations are based on the inputs from the causal nodes into their related conclusion node, as described in FIGS. 7-10 above.

Because of the incongruence of first network determination 13112 and second network determination 1314, the multinet cannot determine with a high degree of certainty that the predicted outcome, i.e., a kick, has actually occurred. Therefore, multinet determination 1316 presents the probabilistic outcome that a kick has actually occurred with only 70% certainty. Because multinet determination 1316 still predicts that the predicted outcome, i.e., a kick, has still occurred, multinet determination 1316 has shown a preference of second network determination 1314 over first network determination 1312. Multinet determination 1316 therefore has a greater degree of certainty in the determined outcome from second network determination 1314.

In situation 4 1322, first network determination 1312 is "no" for whether a kick has occurred. Second network determination 1314 is also "no" for whether a kick has occurred. The first and second network determinations are based on the inputs from the causal nodes into their related conclusion node, as described in FIGS. 7-10 above.

Because of the congruence of first network determination 1312 and second network determination 1314, the multinet can determine with a high degree of certainty that the predicted outcome, i.e., a kick, has not occurred. Therefore, multinet determination 1316 presents the probabilistic outcome that a kick has not occurred with 99% certainty.

Referring now to FIG. 14, a flowchart of the processing steps for generating an oilfield parameter is shown according to an illustrative embodiment.

Process 1400 begins by identifying a first set of decision factors and a second set of decision factors (step 1410). The decision factors are a set of causal variables that are considered when arriving at a conclusion. The decision factors can also be those conclusions that can be ascertained from the set of causal variables. The decision factors generally relate to a condition encountered in a drilling operation, and a remedial action that can be performed in response to that condition. The decision factors can be obtained from surveys, questionnaires, data logs, or other sources of information.

Responsive to identifying the decision factors, process 1400 implements each decision factor into a node, creating a first set of nodes and a second set of nodes (step 1420). Process 1400 then associates the first set of nodes to create a first belief network, and associates the second set of nodes to create a second belief network (step 1430). Nodes of the belief network are associated by interconnecting the set of nodes interconnected with pathways to form a directed acyclic graph. The pathways signify the existence of direct influences between the linked variables.

The various nodes of each belief network are associated in a cause/effect arrangement. Each node containing a causal variable input from decision factors is located upstream from a conclusion. By weighing the various upstream nodes, a belief network is able to generate a conclusion from those nodes. The conclusion nodes of the belief network contain the conclusion generated from the weighting of the causal nodes.

Conclusion nodes themselves may be causal nodes for a subsequent downstream conclusion. For example, a first node is a conclusion node for a set of causal nodes. That first node may itself be one of a second set of causal nodes that feed into a second node, the second node being a conclusion node for the second set of causal nodes.

Various nodes of belief network can be connected using an interactive template having a graphical user interface. A user can then associate the nodes in a desired fashion to create the desired cause/effect relationship between the various nodes of the belief network. It is appreciated that the described method of utilizing a graphical user interface is simply one illustrated method of associating the various nodes to create the belief network. Other methods, such as a parse of the decision factors, language recognition of the decision factors, or other methods of classifying and connecting various decision factors input can also be utilized.

Process 1400 then associates common nodes of the first belief network with common nodes of the second belief network to form a multinet belief network (step 1440). Common nodes are nodes of different belief networks, or nodes contained in a current multinet iteration, that contain identical or substantially similar decision factors. Common nodes in the various belief networks are overlapped, so that conclusion nodes of one belief network can be affected by causal nodes of a different belief network. In this manner, separate belief networks having separate or different causal nodes can be effectively combined into a multinet. Further, causal nodes that may affect more than one decision node can be combined into a unified decision model contained in the multinet.

Process 1400 then generates at least one oilfield parameter from the multinet belief network (step 1450), with the process terminating thereafter. The iteration parameters are input from an operator or engineer. The iteration parameters are observed conditions in an oilfield that relate to one or more conclusions. The iteration parameters correspond to at least one decision factor contained within a node of the multinet. Iteration parameters are input into the corresponding nodes of multinet, to generate the at least one oilfield parameter. Oilfield parameters are typically those conclusions from conclusion nodes in multinet.

Figure 15:
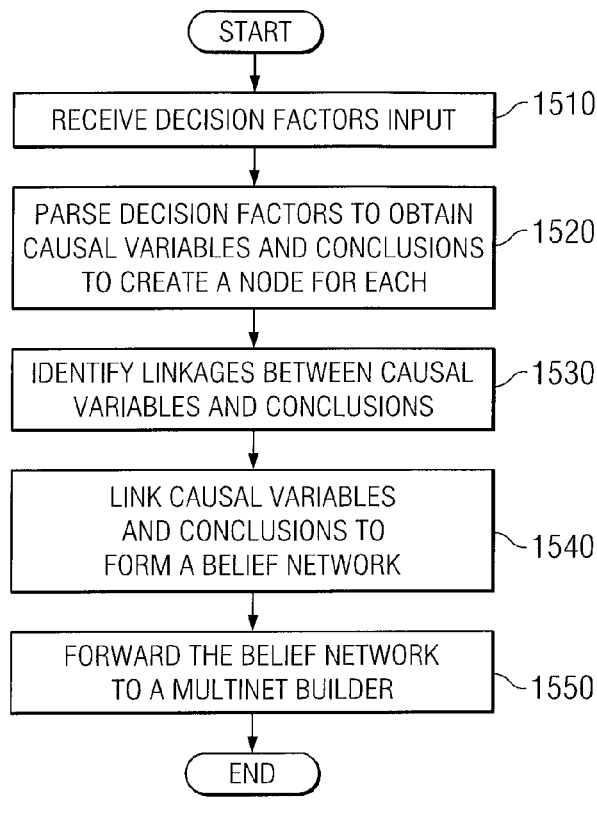
FIG. 15 is a flowchart of the processing steps for generating an oilfield parameter according to an illustrative embodiment.

Referring now to FIG. 15, a flowchart of the processing steps for generating a belief network is shown according to an illustrative embodiment. Process 1500 is a software process, executing on a software component of a data processing system, such as belief network generator 614 of FIG. 6.

Process 1500 begins be receiving a set of decision factors (step 1510). The decision factors are a set of causal variables that are considered when arriving at a conclusion. The decision factors can also be those conclusions that can be ascertained from the set of causal variables. The decision factors generally relate to a condition encountered in a drilling operation and a remedial action that can be performed in response to that condition. The decision factors can be obtained from surveys, questionnaires, data logs, or other sources of information.

Process 1500 then parses the decision factors to obtain causal variables and conclusions, and creates a node for each (step 1520). Process 1500 then identifies linkages between causal variable nodes and conclusion nodes (step 1530). The various nodes of the belief network are associated in a cause/effect arrangement. Each node containing a causal variable input from the decision factors is located upstream from a conclusion. By weighing the various upstream nodes, the belief network is able to generate a conclusion from those nodes. The conclusion nodes of the belief network contain the conclusion generated from the weighting of the causal nodes.

Conclusion nodes themselves may be causal nodes for a subsequent downstream conclusion. For example, a first node is a conclusion node for a set of causal nodes. That first node may itself be one of a second set of causal nodes that feed into a second node, the second node being a conclusion node for the second set of causal nodes.

Process 1500 then links the causal variable nodes and the conclusion nodes to form a belief network (step 1540). The various nodes of belief network can be connected using an interactive template having a graphical user interface. A user can then associate the nodes in a desired fashion to create the desired cause/effect relationship between the various nodes of the belief network. It is appreciated that the described method of utilizing a graphical user interface is simply one illustrated method of associating the various nodes to create the belief network. Other methods, such as a parse of decision factors, language recognition of decision factors, or other methods of classifying and connecting various decision factors input into belief network generator can also be utilized.

Process 1500 then forwards the belief network to a multinet builder (step 1550), with the process terminating thereafter. The multinet builder is a software component executing on a data processing system that connects common nodes of separate belief networks to form a multinet belief network.

Figure 16:
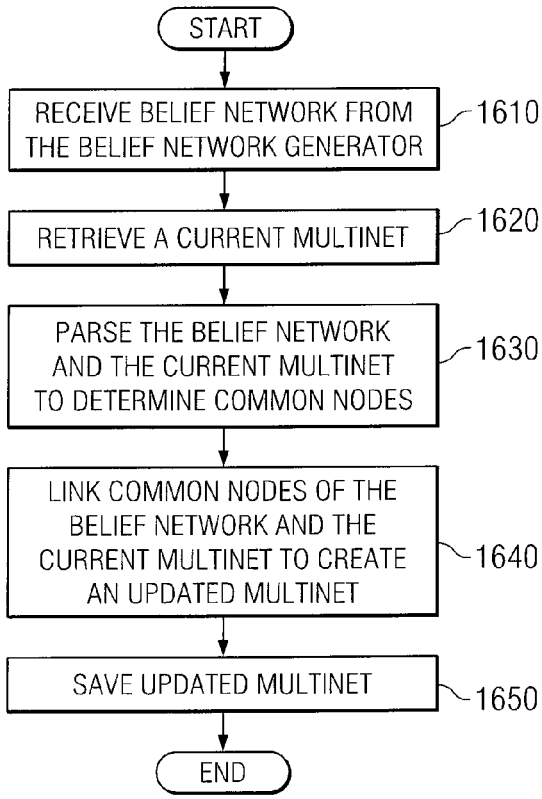
FIG. 16 is a flowchart of the processing steps for generating a multinet belief network according to an illustrative embodiment.

Referring now to FIG. 16, a flowchart of the processing steps for generating a multinet belief network is shown according to an illustrative embodiment. Process 1600 is a software process, executing on a software component of a data processing system, such as multinet builder 618 of FIG. 6.

Process 1600 begins by receiving a belief network from the belief network generator (step 1610). The multinet builder is a software component executing on data processing system that connects common nodes of separate belief networks to form a multinet belief network.

Responsive to receiving the belief network, process 1600 retrieves a current multinet (step 1620). Process 1600 can identify or retrieve the current version of the multinet from an associated data storage, such as storage 622 of FIG. 6. The multinet is a combination of previous separate belief networks.

Process 1600 then parses the belief network and the current version of the multinet to determine common nodes (step 1630). Common nodes are nodes of different belief networks, or nodes contained in a current version of a multinet, that contain identical or substantially similar decision factors. Among other methods, process 1600 can identify common nodes through a key word search, or through operator input and association.

Process 1600 then links common nodes of the belief network and the current version of the multinet to create an updated version of the multinet (step 1640). Once common nodes between belief network and multinet are identified, process 1600 associates the generated nodes to create an updated version of the multinet. Common nodes in the belief network and the multinet are overlapped, so that conclusion nodes of the belief network and the multinet can be affected by each other's causal nodes. In this manner, separate belief networks having separate or different causal nodes can be effectively combined into the multinet. Further, causal nodes that may affect more than one decision node can be combined into a unified decision model contained in the multinet.

Process 1600 then saves the updated multinet (step 1650), with the process terminating thereafter. Process 1600 saves the updated version of the multinet to an associated storage, such as storage 622 of FIG. 6. The update version of the multinet is then available as a diagnostic or predictive analysis tool for generating oilfield parameters in response to a query by an operator or engineer.

Figure 17:
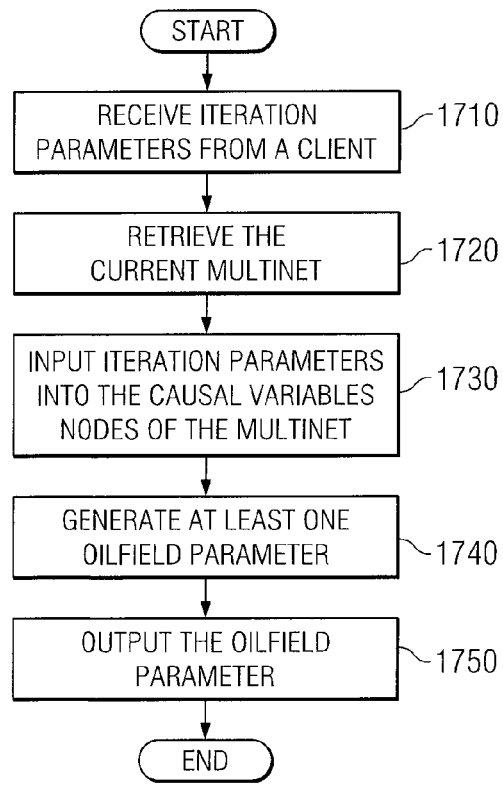
FIG. 17 is a flowchart of the processing steps for generating an oilfield parameter according to an illustrative embodiment.

Referring now to the FIG. 17, a flowchart of the processing steps for generating an oilfield parameter is shown according to an illustrative embodiment. Process 1700 is a software process, executing on a software component of a data processing system, such as multinet answer product 628 of FIG. 6.

Process 1700 begins by receiving iteration parameters from a client (step 1710). Iteration parameters are observed conditions in an oilfield that relate to one or more conclusions. Iteration parameters correspond to at least one decision factor contained within a node of the multinet.

Responsive to receiving the iteration parameters, process 17500 retrieves a current version of the multinet (step 1720). Process 1700 can identify or retrieve the current version of the multinet from an associated data storage, such as storage 622 of FIG. 6. The multinet is a combination of previous separate belief networks.

Process 1700 then inputs the iteration parameters into the causal variable nodes of the multinet (step 1740). Multinet answer product inputs the iteration parameters into the corresponding causal nodes of the multinet to generate oilfield parameters.

Process 1700 then generates at least one oilfield parameter (step 1750). Process 1700 performs, or runs, an iteration of the multinet to generate the conclusions in the conclusion nodes of the multinet. The conclusions contained within the conclusory nodes are oilfield parameters.

Process 1700 then outputs the at least one oilfield parameter (step 1760), with the process terminating thereafter. An operator or engineer receiving the at least one oilfield parameter can then utilize the at least one oilfield parameter in performing drilling operations at a well site, such as well site 400 of FIG. 4. The different illustrative embodiments are directed towards oilfield operations concerning oil in formation within the ground. The use of the term oilfield operations refers to any operation relating to resources in or on the ground. For example, oilfield operations may include operations relating to water resources, natural gas resources, and other mineral resources that may be found on the surface or in the ground.

While the invention has been described with respect to a limited number of embodiments directed to drilling operations, those skilled in the art, having benefit of this disclosure, will appreciate that other embodiments can be devised which do not depart from the scope of the invention as disclosed herein. The present invention may be implemented to any operation in an oilfield, the oilfield including a reservoir having at least one underground formation therein. Oilfield operations can include using conventional EM logging instruments and in general, oilfield operations such as while-drilling, wireline applications, coiled tubing operations, while-tripping, monitoring applications, etc. Methods of the invention are further useful in oilfield operations such operations as modifying the permeability of subterranean formations, production of other subterranean fluids such as water and carbon dioxide, and stimulating geothermal wells. It will also be appreciated that the present invention may be implemented in conjunction with oilfield operations to determine subsurface properties as known in the art, such as seismic and other filed analyses and characterizations.

What is claimed is:

1. A method for determining an oilfield parameter for a drilling operation in an oilfield, the oilfield having a well site with a drilling tool advanced into a subterranean formation with geological structures and reservoirs therein, the method comprising:
    identifying a first set of decision factors about the drilling operation and a second set of decision factors about the drilling operation, wherein each of the first set of decision factors is contained within a first set of nodes, and wherein each of the second set of decision factors is contained within a second set of nodes, wherein both the first set of nodes and the second set of nodes contain a set of common nodes;
    associating the first set of nodes to create a first belief network and associating the second set of nodes to create a second belief network;
    associating the set of common nodes of the first belief network with the set of common nodes of the second belief network to form a multinet belief network; and
    generating at least one oilfield parameter from the multinet belief network.

2. The method of claim 1 further comprising:
    assigning a first degree of certainty to the first belief network; and
    assigning a second degree of certainty to the second belief network.

3. The method of claim 2, the step of generating the at least one oilfield parameter from the multinet belief network comprising:
    preferring the first belief network over the second belief network in generating the at least one oilfield parameter to form a first preference, wherein the first preference is based at least in part on a relative difference between the first degree of certainty and the second degree of certainty.

4. The method of claim 2, wherein the first belief network comprises a first node and a second node, and wherein the second belief network comprises a third node and a fourth node, wherein the first node and the third node are first common nodes, and wherein the second node and the fourth node are second common nodes, the step of associating the set of common nodes of the first belief network with the set of common nodes of the second belief network to form a multinet belief network comprising:
    associating the first node with the third node; and
    associating the second node with the fourth node.

5. The method of claim 1, wherein the first set of decision factors about the drilling operation consists of information selected from the list of:
    equipment for use in the well site;
    completion techniques used in the well site;
    production data from the well site;
    well log data from the well site;
    mud log data from the well site;
    expert information; and
    combinations thereof.

6. The method of claim 1 further comprising:
    directing the drilling operation in the oilfield at the well site based on the at least one oilfield parameter generated from the multinet belief network.

7. The method of claim 6 further comprising:
    collecting a set of information; and
    entering the set of information into at least one of the first set of nodes or the second set of nodes in the multinet belief network, wherein the step of generating the at least one oilfield parameter from the multinet belief network is responsive to entering the set of information; and
    adjusting the drilling operation based on the at least one oilfield parameter generated from the multinet belief network.

8. The method of claim 7, wherein the drilling operation in the oilfield at the well site is adjusted in real time based on the at least one oilfield parameter from the multinet belief network.

9. The method of claim 1, wherein the at least one oilfield parameter is one of a potential problem in an oil well, measured and controlled values, downhole tool settings, signal event detection, and validity of entered or measured oilfield parameters, wherein the potential problem in the oil well is selected from the group consisting of: hole cleaning, sticking, borehole analysis design, trajectory design, whirl, vibration, shock, stability, tendency, bit design, bit selection, offset correlation, kick detection, swab/surge, motor efficiency, drilling automation, positional uncertainty, and a survey program detection; wherein the measured and controlled values is selected from the group consisting of: a weight on a bit, a hookload, a surface weight on the bit, a pump flow rate, and a mud rheology; wherein the downhole tool setting is selected from the group consisting of a preferred tool face, a rotary steerable system idle mode, and a logging while drilling control parameter; and wherein the signal event detection is selected from one of the group consisting of telemetry, logging while drilling, formation determination, signal filtering, and change point determination.

10. A method for determining an oilfield parameter for a drilling operation in an oilfield, the oilfield having a well site with a drilling tool advanced into a subterranean formation with geological structures and reservoirs therein, the method comprising:
    assigning a first degree of certainty to a first belief network in a multinet belief network comprising a plurality of belief networks;
    assigning a second degree of certainty to a second belief network within the multinet belief network; and
    generating at least one oilfield parameter from the first belief network and the second belief network.

11. The method of claim 10, further comprising:
    identifying a first set of decision factors about the drilling operation and a second set of decision factors about the drilling operation, wherein each of the first set of decision factors is contained within a first set of nodes, and wherein each of the second set of decision factors is contained within a second set of nodes, wherein both the first set of nodes and the second set of nodes contain a set of common nodes;

associating the first set of nodes to create the first belief network and associating the second set of nodes to create the second belief network.

12. The method of claim 11 further comprising:

associating the set of common nodes of the first belief network with the set of common nodes of the second belief network to form the multinet belief network, wherein the step of generating the at least one oilfield parameter comprises generating the at least one oilfield parameter from the multinet belief network.

13. The method of claim 11, the step of generating the at least one oilfield parameter from the first belief network and the second belief network further comprising:

preferring the first belief network over the second belief network in generating the at least one oilfield parameter to form a first preference, wherein the first preference is based at least in part on a relative difference between the first degree of certainty and the second degree of certainty.

14. The method of claim 12, wherein the first belief network comprises a first node and a second node, and wherein the second belief network comprises a third node and a fourth node, wherein the first node and the third node are first common nodes, and wherein the second node and the fourth node are second common nodes, the step of associating the set of common nodes of the first belief network with the set of common nodes of the second belief network to form the multinet belief network comprising:

associating the first node with the third node; and
associating the second node with the fourth node.

15. The method of claim 11, wherein the first set of decision factors about the drilling operation consists of information selected from the list of:

equipment for use in the well site;
completion techniques used in the well site;
production data from the well site;
well log data from the well site;
mud log data from the well site;
expert information; and
combinations thereof.

16. The method of claim 11 further comprising:

directing the drilling operation in the oilfield at the well site based on the at least one oilfield parameter generated from the first belief network and the second belief network.

17. The method of claim 11 further comprising:

collecting a set of information; and
entering the set of information into at least one of the first set of nodes of the first belief network or the second set of nodes of the second belief network, wherein the step of generating at least one oilfield parameter from the first belief network and the second belief network is responsive to entering the set of information; and
adjusting the drilling operation based on the at least one oilfield parameter generated from the first belief network and the second belief network.

18. The method of claim 17, wherein the drilling operation in the oilfield at the well site is adjusted in real time based on the at least one oilfield parameter.

19. The method of claim 11, wherein the at least one oilfield parameter is one of a potential problem in an oil well, measured and controlled values, downhole tool settings, signal event detection, and validity of entered or measured oilfield parameters, wherein the potential problem in the oil well is selected from the group consisting of: hole cleaning, sticking, borehole analysis design, trajectory design, whirl, vibration, shock, stability, tendency, bit design, bit selection, offset correlation, kick detection, swab/surge, motor efficiency, drilling automation, positional uncertainty, and a survey program detection; wherein the measured and controlled values is selected from the group consisting of: a weight on a bit, a hookload, a surface weight on the bit, a pump flow rate, and a mud rheology; wherein the downhole tool setting is selected from the group consisting of a preferred tool face, a rotary steerable system idle mode, and a logging while drilling control parameter; and wherein the signal event detection is selected from one of the group consisting of telemetry, logging while drilling, formation determination, signal filtering, and change point determination.

20. A method for determining an oilfield parameter for an oilfield operation in an oilfield, the oilfield having a well site with a drilling tool advanced into a subterranean formation with geological structures and reservoirs therein, the method comprising:

identifying a first set of decision factors about the drilling operation and a second set of decision factors about the drilling operation, wherein each of the first set of decision factors is contained within a first set of nodes, and wherein each of the second set of decision factors is contained within a second set of nodes, wherein both the first set of nodes and the second set of nodes contain a set of common nodes;

associating the first set of nodes to create a first belief network and associating the second set of nodes to create a second belief network;

associating the set of common nodes of the first belief network with the set of common nodes of the second belief network to form a multinet belief network; and generating at least one oilfield parameter from the multinet belief network.

21. The method of claim 20 further comprising:

assigning a first degree of certainty to the first belief network; and
assigning a second degree of certainty to the second belief network.

22. The method of claim 21, the step of generating the at least one oilfield parameter from the multinet belief network comprising:

preferring the first belief network over the second belief network in generating the at least one oilfield parameter to form a first preference, wherein the first preference is based at least in part on a relative difference between the first degree of certainty and the second degree of certainty.

23. The method of claim 21, wherein the first belief network comprises a first node and a second node, and wherein the second belief network comprises a third node and a fourth node, wherein the first node and the third node are first common nodes, and wherein the second node and the fourth node are second common nodes, the step of associating the set of common nodes of the first belief network with the set of common nodes of the second belief network to form a multinet belief network comprising:

associating the first node with the third node; and
associating the second node with the fourth node.

* * * * *